United States Patent
Sodani et al.

(10) Patent No.: US 11,621,923 B2
(45) Date of Patent: Apr. 4, 2023

(54) QUEUEING SYSTEM WITH HEAD-OF-LINE BLOCK AVOIDANCE

(71) Applicant: Marvell Asia Pte, Ltd., Singapore (SG)

(72) Inventors: Avinash Sodani, San Jose, CA (US); Enric Musoll, San Jose, CA (US); Dan Tu, San Mateo, CA (US); Chia-Hsin Chen, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 57 days.

(21) Appl. No.: 17/131,403

(22) Filed: Dec. 22, 2020

(65) Prior Publication Data

US 2021/0320880 A1    Oct. 14, 2021

Related U.S. Application Data

(60) Provisional application No. 63/008,532, filed on Apr. 10, 2020, provisional application No. 63/008,523, filed on Apr. 10, 2020.

(51) Int. Cl.
| | |
|---|---|
| *H04L 12/863* | (2013.01) |
| *H04L 47/62* | (2022.01) |
| *H04L 49/9057* | (2022.01) |
| *H04L 47/10* | (2022.01) |
| *H04L 47/56* | (2022.01) |

(52) U.S. Cl.
CPC .......... *H04L 47/6205* (2013.01); *H04L 47/39* (2013.01); *H04L 47/564* (2013.01); *H04L 49/9057* (2013.01)

(58) Field of Classification Search
CPC ....... H04L 47/39; H04L 47/56; H04L 47/564; H04L 47/6205; H04L 49/3018; H04L 49/9057

USPC ......................................................... 370/412
See application file for complete search history.

(56) References Cited

U.S. PATENT DOCUMENTS

| | | |
|---|---|---|
| 8,271,701 B1 | 9/2012 | Nguyen et al. |
| 8,897,315 B1 | 11/2014 | Arad et al. |
| 9,007,902 B1 | 4/2015 | Medina |
| 9,807,027 B2 | 10/2017 | Shumsky et al. |
| 9,886,273 B1 | 2/2018 | Eldar et al. |
| 9,900,903 B1 | 2/2018 | Rottenstreich |
| 10,200,313 B2 | 2/2019 | Zemach et al. |

(Continued)

OTHER PUBLICATIONS

U.S. Appl. No. 16/864,031, Dan Tu et al., "System and Methods for Mesh Architecture for High Bandwidth Multicast and Broadcast Network," filed Apr. 30, 2020.

*Primary Examiner* — Robert J Lopata

(57) ABSTRACT

Control logic circuitry stores packets in a queue in an order in which the packets are received. A head entry of the queue corresponds to an oldest packet in the order. The control logic circuitry receives flow control information corresponding to multiple target devices including at least a first target device and a second target device. The control logic circuitry determines, using the flow control information, whether the oldest packet stored in the head entry can be transferred to the first target device, and in response to determining that the oldest packet stored in the head entry cannot be transferred to the first target device, i) selects an other entry with an other packet behind the head entry according to the order, and ii) transfers the other packet to the second target device prior to transferring the oldest packet in the head entry to the first target device.

21 Claims, 9 Drawing Sheets

(56) References Cited

U.S. PATENT DOCUMENTS

| | | | | |
|---|---|---|---|---|
| 2003/0035372 A1* | 2/2003 | Schaub | ............... | H04L 49/901 370/389 |
| 2014/0068205 A1* | 3/2014 | Mayhew | ............... | H04L 49/356 711/159 |
| 2015/0221358 A1* | 8/2015 | Brandl | ............... | G06F 13/1668 711/167 |

* cited by examiner

QUEUEING SYSTEM WITH HEAD-OF-LINE BLOCK AVOIDANCE

CROSS REFERENCES TO RELATED APPLICATIONS

This application claims the benefit of U.S. Provisional Patent Application No. 63/008,523, entitled "Head-of-Line Block Avoidance While Preserving SRC-DEST Pair Packet Ordering," filed on Apr. 10, 2020, and U.S. Provisional Patent Application No. 63/008,532, entitled "Head-of-Line Block Avoidance While Preserving SRC-DEST Pair Packet Ordering," filed on Apr. 10, 2020. Both of the applications referenced above are incorporated herein by reference in their entireties.

FIELD OF TECHNOLOGY

The present disclosure relates generally to computer processors, and more particularly to systems for distributing data to multiple subsystems within a computer processor.

BACKGROUND

Some data processing systems, such as a parallel processing systems, image processors, machine learning (ML) systems, etc., include multiple processing subsystems (or cores), each including one or more processors, a memory, etc., and data is distributed by a data distribution system to the multiple processing subsystems so that the multiple processing subsystems can process the data. As an illustrative example, a data distribution system distributes data retrieved from a main memory to multiple cores, and the data is stored in respective local memories of the cores. The cores subsequently retrieve the data from the respective local memories and process the data.

Some such data distribution systems include routers with first-in-first-out (FIFO) queues to preserve the ordering of data packets distributed amongst the cores. However, if a destination is not ready to receive a data packet at a head of a FIFO queue, all other data packets in the FIFO queue cannot be transmitted, which is sometimes referred to as "head-of-line blocking." Head-of-line blocking can lead to processing delays and/or decreased throughput.

Some processing systems include routers that do not use FIFO queues so that packets can be transmitted in a different order than they were received and thus avoid head-of-line blocking, but such routers require the distribution of additional metadata in the processing system and additional logic and buffers at destinations to allow the ordering of packets to be reconstructed at the destinations. As an example, each data packet includes a source identifier and a packet identifier, which indicates an order of the packet amongst a stream of packets from a source node corresponding to the source identifier. Data packets are stored in a reordering buffer at a destination node, and reordering logic at the destination node uses the source identifier and the packet identifier to reconstruct an order of data packets received from the source node. The need to distribute such metadata and the need for additional buffering and reordering logic at destinations can significantly increase the cost of a data processing system, especially when the number of cores is high.

SUMMARY

In an embodiment, an apparatus comprises: a queue including a plurality of entries, the plurality of entries including a head entry; and control logic circuitry configured to: store packets received by the apparatus in the queue in an order in which the packets are received until the packets can be transferred to a plurality of target devices, wherein the head entry corresponds to an oldest packet in the order. The control logic circuitry is also configured to: receive flow control information corresponding to the plurality of target devices, the plurality of target devices including at least a first target device and a second target device, determine, using the flow control information, whether the oldest packet stored in the head entry can be transferred to the first target device, and in response to determining that the oldest packet stored in the head entry cannot be transferred to the first target device, i) select an other entry behind the head entry according to the order, the other entry storing an other packet that can be transferred to the second target device, and ii) transfer the other packet to the second target device prior to transferring the oldest packet in the head entry to the first target device.

In another embodiment, a method for transferring packets to a set of multiple target devices includes: receiving a plurality of packets; storing the plurality of packets in respective entries of a queue in an order in which the plurality of packets were received, wherein a head entry of the queue corresponds to an oldest packet in the order; receiving flow control information corresponding to the set of multiple target devices, the flow control information indicating whether one or more target devices, among the set of multiple target devices, are available to receive packets; determining, using the flow control information, whether any target devices for which the oldest packet is intended is available to receive the oldest packet; and in response to determining that no target devices for which the oldest packet is intended are available to receive the oldest packet, selecting an other entry, behind the head entry according to the order, that stores an other packet intended for at least one target device that is available to receive the other packet, and transferring the other packet in the other entry, behind the head entry according to the order, to at least one target device for which the other packet is intended prior to transferring the oldest packet in the head entry to a target device for which the oldest packet is intended.

DETAILED DESCRIPTION

Figure 1:
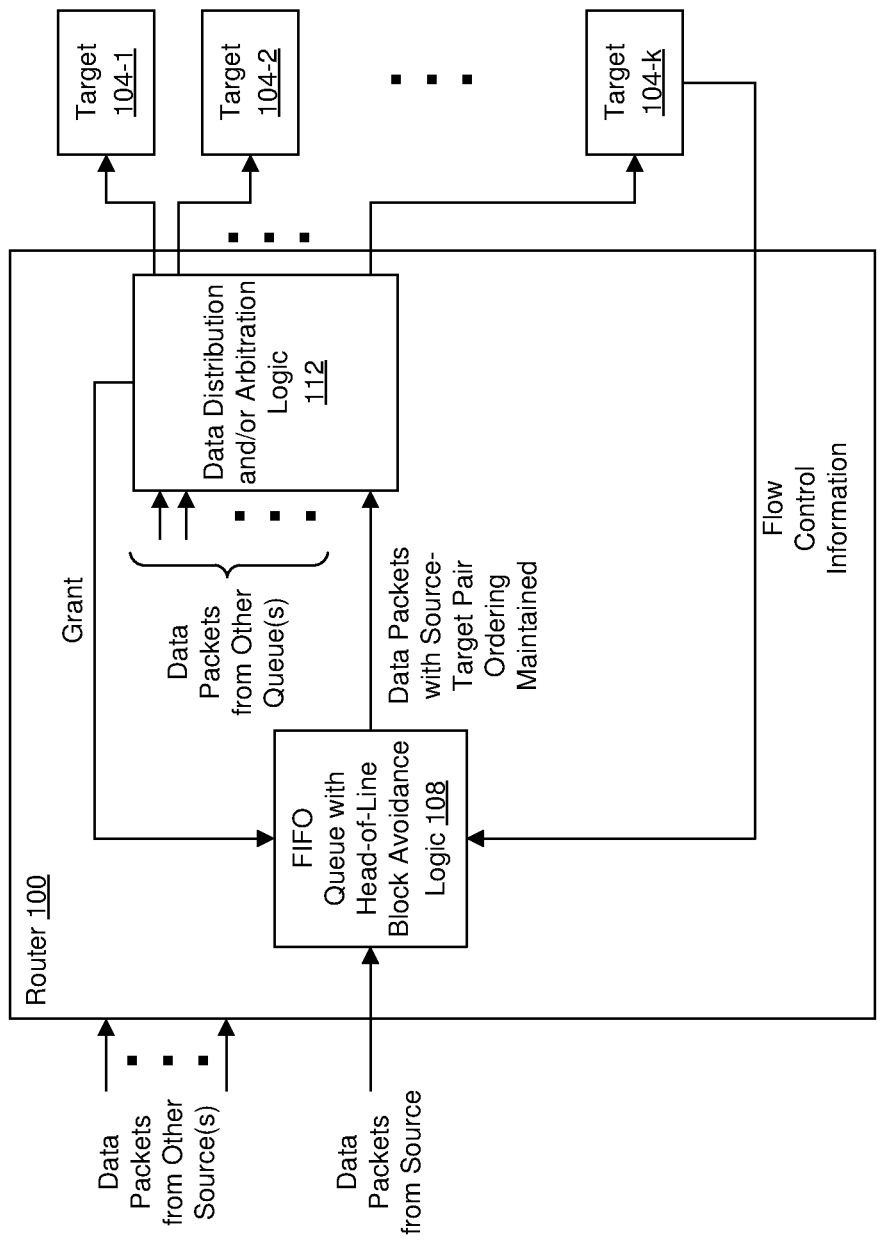
FIG. 1 is a simplified diagram of an example data distribution node that includes head-of-line block avoidance logic, according to an embodiment.

The following description discloses many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purposes of brevity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

In various embodiments described below, a processing system utilizes head-of-line blocking avoidance systems and/or techniques that permit a node to transmit data packets in an order that is different than an order in which the data packets were received, while still preserving the respective orders of data packets between source-destination pairs. For example, in some embodiments, a node includes a queue and stores incoming data packets in the queue in an order in which the data packets were received. Additionally, the node monitors the respective status of multiple destinations with regard to whether each destination is ready to accept a data packet, in some embodiments. When a data packet reaches a head of the queue and a destination for the packet is not ready to accept the data packet, the node selects (according to the order in which data packets were stored in the queue) another data packet in the queue intended for another destination that is ready to accept a data packet, and transmits the other data packet to the other destination, according to some embodiments.

FIG. 1 is a simplified diagram of an example data distribution node (sometimes referred to herein as a "router") 100 that may be included in a data processing system having multiple processing subsystems (or cores), each including one or more processors, a memory, etc., according to an embodiment. The router 100 distributes data packets from one or more sources (which may include, e.g., one or more cores, one or more other routers, a direct memory access (DMA) device, etc.) in the data processing system to a plurality of targets 104 (which may include, e.g., one or more cores, one or more other routers, a DMA device, etc.) in the data processing system.

In some embodiments, the router 100 operates as a queuing system that receives data packets and stores the data packets in a queue until the packets can be distributed to a plurality of targets. The router 100 includes a first-in-first-out (FIFO) queue 108 having head-of-line blocking avoidance logic (sometimes referred to herein as "the FIFO queue 108" for brevity) that permits the output of data packets in an order that is different than an order in which the data packets were received at the FIFO queue 108, while still preserving respective orderings of data packets between source-destination pairs, according to an embodiment.

The FIFO queue 108 receives data packets from a particular source and stores the data packets in an order in which the data packets are received from the source. In one embodiment, the router 100 includes one or more other FIFO queues (not shown in FIG. 1 to improve clarity) the same as or similar to the FIFO queue 108, and data packets received from one or more other sources are respectively stored in the one or more other FIFO queues. In another embodiment, the router 100 does not include any other FIFO queues the same as or similar to the FIFO queue 108, and data packets received from one or more other sources are also stored in the FIFO queue 108. In another embodiment, the router 100 only receives data packets from a single source and does not include any other FIFO queues the same as or similar to the FIFO queue 108.

The FIFO queue 108 is communicatively coupled to the plurality of targets 104. For example, the FIFO queue 108 is communicatively coupled to the plurality of targets 104 via conductive traces and buffer circuits, in various embodiments. In some embodiments in which the router 100 receives data packets from one or more other sources, the router 100 includes data distribution and/or arbitration logic 112 (sometimes referred to herein as "data distribution logic 112" for brevity) that communicatively couples the FIFO queue 108 with the plurality of targets 104. In an embodiment, the data distribution logic 112 includes a crossbar circuit that is configured to communicatively couple multiple inputs (e.g., coupled to outputs of respective FIFO queues such as the FIFO queue 108) of the data distribution logic 112 to multiple outputs of the data distribution logic 112 (e.g., which are communicatively coupled to inputs of respective targets 104). In some embodiments, each data packet includes or is associated with target identifier information (e.g., an address, a bitmap, etc.) that indicates one or more targets 104 for which the data packet is intended.

In some embodiments in which the data distribution logic 112 includes a crossbar circuit, the data distribution logic 112 includes an arbitration circuit that, when multiple data packets from multiple FIFO queues are intended for a single target 104 during a particular clock cycle, selects which one of the multiple data packets are routed to the single target 104 during the clock cycle.

In some embodiments in which the router 100 includes only a single FIFO queue 108, the data distribution logic 112 does not include arbitration logic and includes a multiplexer that routes data packets from the FIFO queue 108 to the targets 104. In some embodiments, target identifier information for a data packet provided to an input of the multiplexer is used to control the multiplexer so that the multiplexer routes the data packet to the intended target 104.

The FIFO queue 108 receives flow control information from the targets 104, where the flow control information from each target 104 indicates whether the target 104 can accept a data packet from the FIFO queue 108. For example, in some embodiments, the target 104 includes an input queue in which incoming data packets are stored and from which the target 140 retrieves data packets for processing. When the input queue of the target 104 becomes full the target 104 is not available to accept incoming data packets, and thus the target 104 indicates to the FIFO queue 108, via the flow control information, that the target 104 cannot accept incoming data packets. Similarly, when the input queue is no longer full, the target 104 is again available to accept incoming data packets, and thus the target 104 indicates to the FIFO queue 108, via the flow control information, that the target 104 is ready to accept incoming data packets.

In an embodiment, the flow control information from a target 104 comprises credits that indicate how much buffer storage is available at the target 104 (at least for the FIFO queue 108), and the FIFO queue 108 keeps track of the credits received from each target 104. When the FIFO queue 108 transfers a data packet to a particular target 104, the FIFO queue 108 decrements the credits for that target 104. If the credits for a particular target 104 are zero, this indicates the target is not available to receive a packet and thus the FIFO queue 108 is not permitted to transfer a data packet to that target 104 and must wait until the FIFO queue 108 receives additional credits from that target 104.

In another embodiment, the flow control information from a target 104 comprises a pause signal that, when asserted, indicates that the target 104 is not ready to receive a data packet from the FIFO queue 108; on the other hand, when the pause signal is not asserted, this indicates that the target 104 is ready to receive a data packet from the FIFO queue 108.

In some embodiments in which the data distribution logic 112 includes arbitration logic, the FIFO queue 108 receives grant information from the arbitration logic, where the grant information indicates, for each target 104, whether the data distribution logic 112 distributed a data packet from the FIFO queue 108 to the target 104. The grant information is an example of transfer confirmation information that indicates whether a data packet was transferred to a target.

In other embodiments, such as embodiments in which the data distribution logic 112 does not include arbitration logic, the FIFO queue 108 does not receive grant information from the data distribution logic 112. In some embodiments in which the data distribution logic 112 does not include arbitration logic, the FIFO queue 108 receives transfer confirmation information from each target 104, the transfer confirmation information indicating whether a target 104 received a data packet transferred from the FIFO queue 108. In other embodiments in which the data distribution logic 112 does not include arbitration logic, the FIFO queue 108 does not receive transfer confirmation information. For example, in some embodiments, when the FIFO queue 108 outputs a data packet the FIFO queue 108 assumes that the data packet was transferred to the intended target(s) 104.

In operation, the router 100 receives data packets and stores the data packets in the FIFO queue 108 in an order in which the data packets are received by the router 100 (an order in which packets are received is sometimes referred to herein as a "receive order"). Generally, the router 100 stores data packets until the packets can be transferred to the plurality of targets 104. The FIFO queue 108 determines, using the flow control information received from the targets 104, whether an oldest data packet stored in the head entry of the FIFO queue 108 can be transferred to an intended target 104 of the oldest packet. In response to determining that the oldest data packet stored in the head entry cannot be transferred to the intended target, the FIFO queue 108 i) selects another entry behind the head entry in the receive order, the other entry storing another data packet that can be transferred to another target 104, and ii) transfers the other data packet to the other target prior to transferring the oldest data packet in the head entry to the intended target 104 of the oldest data packet. Another entry is considered "behind" the head entry when the other entry stores a packet that was received by the FIFO queue 108 after the packet in the head entry. The other entry may be immediately behind the head entry (i.e., there are no further entries between the head entry and the other entry), or there may be one or more further entries between the head entry and the other entry.

In other words, the FIFO queue 108 uses the flow control information from the targets 104 to select which entry in the FIFO queue 108 is output to the data distribution logic 112. For example, if the intended target 104 for a data packet in the head entry of the FIFO queue 108 is ready to receive a data packet, the FIFO queue 108 provides the data packet in the head entry to the data distribution logic 112. On the other hand, if the intended target 104 for the data packet in the head entry of the FIFO queue 108 is not ready to receive a data packet, the FIFO queue 108 selects another data packet in another entry and provides the other data packet to the data distribution logic 112.

Figure 2:
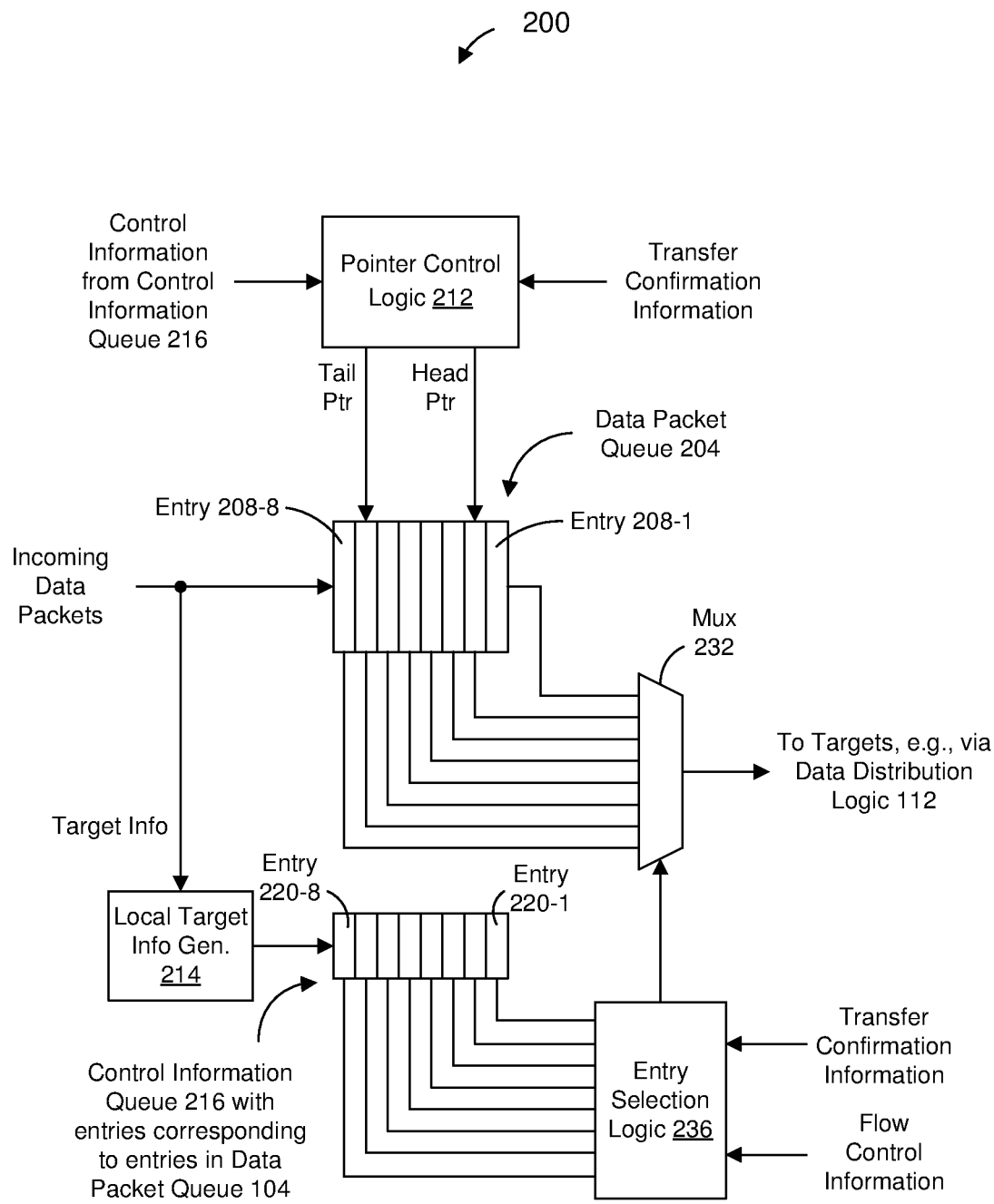
FIG. 2 is a simplified diagram of an example queue with head-of-line blocking avoidance logic, which is utilized in the data distribution node of FIG. 1, according to an embodiment.

FIG. 2 is a simplified diagram of an example FIFO queue 200 with head-of-line blocking avoidance logic (sometimes referred to herein as "the FIFO queue 200" for brevity), according to an embodiment. The FIFO queue 200 is included in the example router 100 of FIG. 1 as the FIFO queue 108, according to an embodiment. In other embodiments, the router 100 includes another suitable FIFO queue 108 different than the FIFO queue 200. The FIFO queue 200 is included in another suitable queueing system different than the router 100, in some embodiments.

The FIFO queue 200 includes a data packet queue 204 with a plurality of entries 208 arranged in an order (sometimes referred to herein as the "entry order"). Although eight entries 208 are illustrated in FIG. 2, the data packet queue 204 includes another suitable amount of entries 208 different than eight in other embodiments. At least payloads (or data portions) of incoming data packets are stored in the data packet queue 204 in an order in which the data packets are received at the FIFO queue 200, i.e., the receive order. In some embodiments, the entire data packet is stored in the data packet queue 204.

In some embodiments, each entry 208 is associated with a respective memory address, and the memory addresses of the entries 208 indicate an ordering of the entries 208, i.e., the entry order. The data packet queue 204 is included in a register set, each entry 208 corresponds to a respective register in the register set, and each memory address is an address of a respective register in the register set, according to one illustrative embodiment. In another illustrative embodiment, the data packet queue 204 is included in a random access memory (RAM), each entry 208 corresponds to a respective set of one or more memory locations in the RAM, and each memory address is an address of a respective memory location in the RAM.

A head pointer indicates a memory address of an entry 208 (sometimes referred to herein as the "head entry") in which an oldest received data packet is stored, and a tail pointer indicates a memory address of an entry 208 at which a next incoming data packet should be stored.

Pointer control logic 212 generates the head pointer and the tail pointer. For example, in connection with storing a new data packet (or a payload of the new data packet) in the queue 204, the pointer control logic 212 updates the tail pointer to point to a next entry 208 (according to the entry order) in the data packet queue 204. Similarly, in connection with transferring an oldest data packet (or a payload of the new data packet) from the data packet queue 204, the pointer control logic 212 updates the head pointer to point to a next entry 208 (according to the entry order) in the queue. In some embodiments, the pointer control logic 212 is configured to increment (in a modulo manner) the tail pointer in connection with storing a new data packet (or a payload of the new data packet) in the data packet queue 204 so that the tail pointer points to a next entry 208 in the data packet queue 204, and to increment (in a modulo manner) the head pointer in connection with transferring an oldest data packet (or a payload of the new data packet) from the data packet queue 204 so that the head pointer points to a next entry 208 that holds the new oldest entry in the data packet queue 204. In other embodiments, the pointer control logic 212 is configured to decrement (in a modulo manner) the tail pointer in connection with storing a new data packet (or a payload of the new data packet) in the data packet queue 204 so that the tail pointer points to a next entry 208 in the data packet queue 204, and to decrement (in a modulo manner) the head pointer in connection with transferring an oldest data packet (or a payload of the new data packet) from the queue 204 so that the head pointer points to a next entry 208 that holds the new oldest entry in the data packet queue 204. In an embodiment, the data packets are stored in the queue 204 so that the receive order corresponds to the entry order. For example, when the pointer control logic 212 updates the head pointer to point to a next entry 208 according to the entry order, the head pointer will point to a next oldest data packet according to the receive order.

In some embodiments, the pointer control logic 212 receives transfer confirmation information, e.g., from the targets 104 (FIG. 1) and/or the data distribution logic 112 (FIG. 1), that indicates when a data packet has been transferred to an intended target 104, and the pointer control logic 212 is configured to update (e.g., decrement, increment, etc.) the head pointer in response to the transfer confirmation information indicating that the intended target 104 received the data stored in the head entry of the queue 204. In some embodiments in which the data distribution logic 112 (FIG. 1) includes arbitration logic, the pointer control logic 212 receives grant information (an example of transfer confirmation information) from the arbitration logic that indicates when a data packet has been transferred to an intended target 104, and the pointer control logic 212 is configured to update (e.g., decrement, increment, etc.) the head pointer in response to the grant information indicating that the intended target 104 received the data stored in the head entry of the queue 204.

The FIFO queue 200 also comprises a local target information generator 214. When a data packet is received, target information in the data packet, or otherwise associated with the data packet, is received by the local target information generator 214. The target information indicates one or more targets that are to receive the data packet. In an embodiment, the target information comprises a bitmap, where each bit corresponds to a respective target, and a bit is set to one to indicate that the data packet is intended for the corresponding target whereas the bit is set to zero to indicate that the data packet is not intended for the corresponding target. In another embodiment, the target information comprises an address corresponding to one or more targets (e.g., a unicast address corresponding to a single target, a multicast address corresponding to a set of multiple targets, etc.).

In some embodiments, the target information associated with each data packet (sometimes referred to herein as "system level target information") is for identifying targets among a plurality of targets of a larger system, where the plurality of targets includes the targets 104 (FIG. 1) that are locally coupled to the router 100 as well as other targets that are not locally coupled to the router 100 (FIG. 1), e.g., targets other than the targets 104. Thus, in at least some such embodiments, the length of the system level target information (in bits) associated with each data packet is longer than necessary to identify targets among the targets 104 locally coupled to the router 100. Thus, the local target information generator 214 is configured to generate, using the system level target information, local target information that identifies targets from among the targets 104, where the local target information has a shorter length (in bits) as compared to the system level target information, according to some embodiments.

In some embodiments, the local target information generated by the local target information generator 214 comprises a bitmap where each bit corresponds to a respective target 104, and a bit is set to one to indicate that the data packet is intended for the corresponding target whereas the bit is set to zero to indicate that the data packet is not intended for the corresponding target. In another embodiment, the local target information comprises an address corresponding to one or more targets 104 (e.g., a unicast address corresponding to a single target 104, a multicast address corresponding to a set of multiple targets 104, etc.).

The local target information generator is coupled to a control information queue 216 having entries 220, each entry 220 corresponding to a respective entry 208 in the data packet queue 204. For example, the entries 220 are arranged in an order the same as or similar to the entry order in which the entries 208 of the data packet queue 204 are arranged, according to an embodiment. Although the control information queue 216 is illustrated in FIG. 2 as being separate from the data packet queue 204, in some embodiments each entry 220 is stored in a same memory location (or set of memory locations) as the corresponding entry 208. As an example, the data packet queue 204 and the control information queue 216 may form a single queue, and each pair of corresponding entries 208, 220 are included within a respective entry of the single queue, according to an embodiment.

The local target information for a received data packet is stored in an entry 220 of the control information queue corresponding to the entry 208 in the data packet queue 204 in which the data packet is stored. Thus, the local target information stored in each entry 220 of the control information queue 216 indicates the target 104 to which a corresponding data packet in the data packet queue 204 is to be transferred.

The FIFO queue 200 further comprises a multiplexer 232 that is coupled to the data packet queue 204. The multiplexer 232 selects, according to control information generated by entry selection logic 236, one of the entries 208 of the data packet queue 204 to output.

The entry selection logic 236 receives flow control information from the targets 104 (FIG. 1), local target information from the control information queue 216, and the head pointer generated by the pointer control logic 212, and uses the flow control information, the local target information, and the head pointer to generate the control information provided to the multiplexer 232. The control information generated by the entry selection logic 236 controls the multiplexer 232 to select one of the entries 208 of the data packet queue 204 to output.

In an embodiment, the flow control information received by the entry selection logic 236 comprises credits that indicate how much buffer storage is available at the target 104 (at least for the FIFO queue 200), and the entry selection logic 236 keeps track of the credits received from each target 104. When the FIFO queue 200 transfers a data packet to a particular target 104, the entry selection logic 236 decrements the credits for that target 104. If the credits for a particular target 104 are zero, the entry selection logic 236 determines that the target 104 is not available to receive a data packet from the FIFO queue 200.

In another embodiment, the flow control information from a target 104 comprises a pause signal that, when asserted, indicates that the target 104 is not ready to receive a data packet from the FIFO queue 108; on the other hand, when the pause signal is not asserted, this indicates that the target 104 is ready to receive a data packet from the FIFO queue 108.

According to an embodiment, in response to determining, using the flow control information, that an intended target of the data packet in the head entry is available to receive a data packet, the entry selection logic 236 controls the multiplexer 232 to select the head entry in the data packet queue 204 to output. In connection with the multiplexer 232 outputting the head entry in the data packet queue 204, the pointer control logic 212 updates the head pointer to point to another entry 208 behind the head entry (according to the entry order and according to the receive order) in the data packet queue 204. Another entry 208 is considered "behind" the head entry 208 according to the receive order when the other entry 208 includes another packet that was received by the data packet queue 204 after the data packet in the head entry 208 was received. The other entry 208 may be immediately behind the head entry 208 (i.e., there are no further entries 208 between the head entry 208 and the other entry 208), or there may be one or more further entries 208 between the head entry 208 and the other entry 208.

On the other hand, in response to determining, using the flow control information, that the intended target of the data packet in the head entry is not available to receive a data packet, the entry selection logic 236 controls the multiplexer 232 to select another entry 208 behind the head entry (according to the receive order) in the data packet queue 204 to output. In some embodiments, when the entry selection logic 236 i) selects another entry 208, behind the head entry (according to the receive order), for the multiplexer 232 to output, and ii) receives transfer confirmation information that indicates the data packet stored in the other entry 208 was transferred to the intended target, the entry selection logic 236 stores, in the corresponding entry 220 in the control information queue 216, information that indicates the data packet stored in the other entry 208 has been transferred to the intended target. When the entry selection logic 236 is to select another entry 208 behind the head entry (according to the receive order) in the data packet queue 204 that is to be transferred, the entry selection logic 236 uses control information in the control information queue 216 to select an entry 208 that stores a data packet that has not already been transferred.

In an embodiment, when the intended target of a data packet in the head entry is not available to receive the data packet, the entry selection logic 236 controls the multiplexer 232 to select another entry 208 behind the head entry (according to the receive order) that stores a data packet that i) has not already been transferred to an intended target (e.g., determined using control information in the control information queue 216), and ii) is intended for a target that is available to receive the data packet (e.g., determined using the flow control information in the control information queue 216). For example, in an embodiment, when the intended target of a data packet in the head entry is not available to receive the data packet, the entry selection logic 236 selects a next entry 208 (determined according to the receive order) behind the head entry that stores a data packet that i) has not already been transferred to an intended target, and ii) is intended for a target that is available to receive the data packet.

Regarding the pointer control logic 212, in connection with the data packet in the head entry being transferred to an intended target, the pointer control logic 212 determines, using control information in the control information queue 216, a next entry 208 (according to the entry order) that has not yet been transferred to an intended target, and updates the head pointer to point to the determined next entry 208, according to an embodiment. As an illustrative example, if control information in the control information queue 216 determines that two entries immediately behind the head entry have already been transferred to intended targets, the pointer control logic 212, in connection with the data packet in the head entry being transferred to an intended target, updates the head pointer to point to a third entry behind the two entries (according to the entry order), according to an embodiment.

Figure 3A:
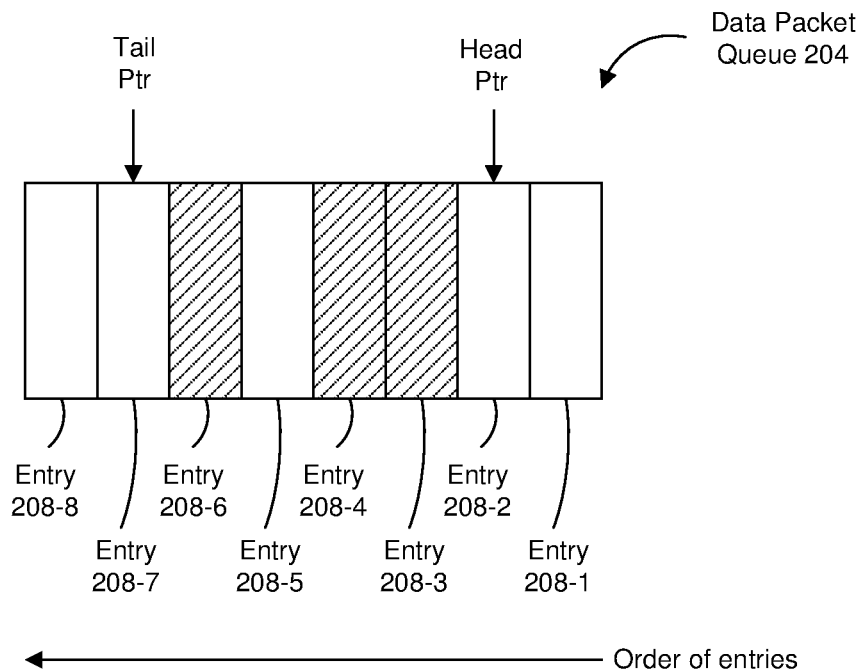
FIGS. 3A-B are simplified diagrams of a data packet queue of FIG. 2 that illustrate an example scenario involving updating of a head pointer of the data packet queue, according to an embodiment.
Figure 3B:
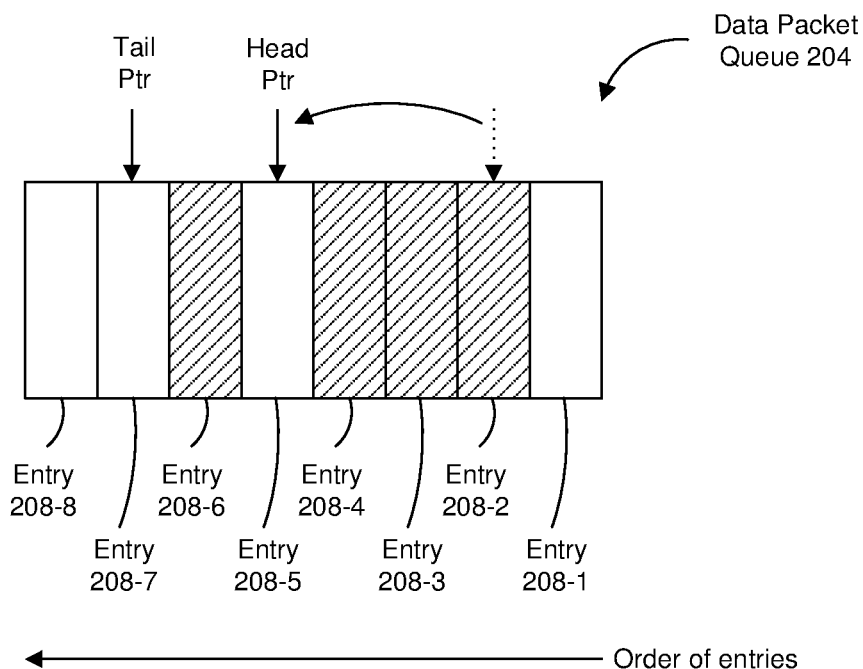

FIGS. 3A-B are simplified diagrams of the data packet queue 204 illustrating an example scenario involving updating of the head pointer by the pointer control logic 212, according to an embodiment. The entries 208 are arranged in the entry order. For example, entry 208-2 follows entry 208-1 in the entry order, entry 208-3 follows entry 208-2 in the entry order, etc. In an embodiment, the entry order is a circular order or modulo order. For example, entry 208-1 follows entry 208-8 in the entry order.

In the example scenario of FIG. 3A, the head pointer is pointing to entry 208-2 and the tail pointer is pointing to entry 208-7. Entries 208-3, 208-4, and 208-6 are cross-hatched to indicate that data packets in entries 208-3, 208-4, and 208-6 have already been transferred to intended targets, whereas a data packet in the head entry 208-2 has not yet been transferred to an intended target. For example, while an intended target 204 of a first data packet in the head entry 208-2 was not available to receive the first data packet, the entry selection logic 236 controlled the multiplexer 232 to transfer a second data packet in the entry 208-3, a third data packet in the entry 208-4, and a fourth data packet in the entry 208-6. For instance, the entry selection logic 236 determined that intended targets 204 of the second data packet, the third data packet, and the fourth data packet were available to receive data packets. Thus, even though the intended target of the first data packet in the head entry 208-2 was not ready to receive the first data packet, the first data packet in the head entry 208-2 did not block the transfer of the second data packet in the entry 208-3, the third data packet in the entry 208-4, and the fourth data packet in the entry 208-6 to other targets 204.

FIG. 3B illustrates the data packet queue 204 after the first data packet in the head entry 208-2 has been transferred to the intended target. In FIG. 3A, the pointer control logic 212 has updated the head pointer to point to entry 208-5 because entry 208-5 is the next entry, according to the entry order, that contains a data packet that has not yet been transferred to an intended target. Although entries 208-3 and 208-4 come before entry 208-5 in the entry order, the second data packet and the third data packet in entries 208-3 and 208-4, respectively, have already been transferred to intended targets; thus, when updating the head pointer, the pointer control logic 212 "skips over" entries 208-3 and 208-4, in the example scenario illustrated in FIGS. 3A-B.

Figure 4:
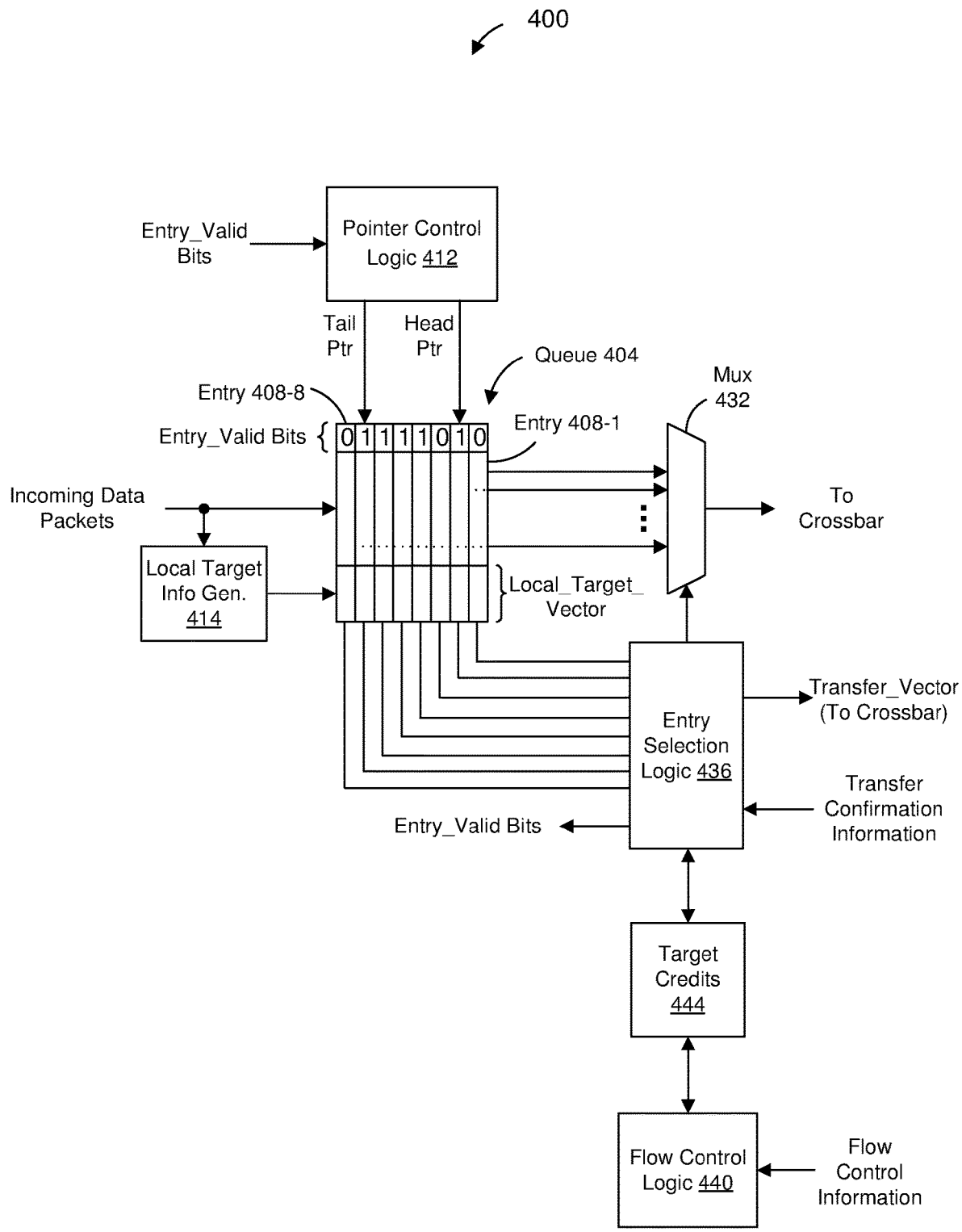
FIG. 4 is a simplified diagram of another example queue with head-of-line blocking avoidance logic, which is utilized in the data distribution node of FIG. 1, according to another embodiment.

FIG. 4 is a simplified diagram of another example FIFO queue 400 with head-of-line blocking avoidance logic (sometimes referred to herein as "the FIFO queue 400" for brevity), according to another embodiment. The FIFO queue 400 is included in the example router 100 of FIG. 1 as the FIFO queue 108, according to an embodiment. In other embodiments, the router 100 includes another suitable FIFO queue 108 different than the FIFO queue 400. The FIFO queue 400 is included in another suitable queueing system different than the router 100, in some embodiments.

The FIFO queue 400 permits the transfer of a data packet to multiple targets 104, e.g., multicasting the data packet to multiple targets 104, broadcasting the data packet to all targets 104, etc.

The FIFO queue 400 includes a queue 404 with a plurality of entries 408 arranged in an order, i.e., an entry order. Although eight entries 408 are illustrated in FIG. 4, the queue 404 includes another suitable amount of entries 408 different than eight in other embodiments. At least payloads (or data portions) of incoming data packets are stored in respective entries 408 of the queue 404 in an order in which the data packets are received at the FIFO queue 400, i.e., a receive order. When a data packet is stored in an entry 408 of the queue 404, a bit (referred to herein as an "Entry_Valid bit") in the entry 408 is set to one to indicate that the data packet needs to be transferred to at least one target 104. As will be described below, the Entry_Valid bit in the entry 408 is subsequently set to zero when the FIFO queue 400 has transferred the data packet in the entry 408 to all targets 104 for which the data packet was intended.

In an embodiment, each entry 408 is associated with a respective memory address, and the memory addresses of the entries 408 indicate an order of entries, i.e., the entry order. The queue 404 is included in a register set, each entry 408 corresponds to a respective register in the register set, and each memory address is an address of a respective register in the register set, according to an embodiment. In another embodiment, the queue 404 is included in a RAM, each entry 408 corresponds to a respective set of one or more memory locations in the RAM, and each memory address is an address of a respective memory location in the RAM.

A head pointer indicates a memory address of an entry 408 (sometimes referred to herein as the "head entry") in which an oldest received data packet is stored, and a tail pointer indicates a memory address of an entry 408 at which a next incoming data packet should be stored.

Pointer control logic 412 generates the head pointer and the tail pointer. For example, in connection with storing a new data packet (or a payload of the new data packet) in the queue 404, the pointer control logic 412 updates the tail pointer to point to a next entry 408 (according to the entry order) in the queue 404. Similarly, in connection with transferring an oldest data packet (or a payload of the oldest data packet) to all of the intended target(s) of the oldest data packet, the pointer control logic 412 updates the head pointer to point to a next entry 408 (according to the entry order and the receive order) in the queue. In some embodiments, the pointer control logic 412 is configured to increment (in a modulo manner) the tail pointer in connection with storing a new data packet (or a payload of the new data packet) in the queue 404 so that the tail pointer points to a next entry 408 in the queue 404, and to increment (in a modulo manner) the head pointer in connection with transferring an oldest data packet (or a payload of the oldest data packet) from the queue 404 so that the head pointer points to a next entry 408 that holds the new oldest entry in the queue 404. In other embodiments, the pointer control logic 412 is configured to decrement (in a modulo manner) the tail pointer in connection with storing a new data packet (or a payload of the new data packet) in the queue 404 so that the tail pointer points to a next entry 408 in the queue 404, and to decrement (in a modulo manner) the head pointer in connection with transferring an oldest data packet (or a payload of the oldest data packet) from the queue 404 so that the head pointer points to a next entry 408 that holds the new oldest entry in the queue 404.

In an embodiment, the data packets are stored in the queue 404 so that the receive order corresponds to the entry order. For example, when the pointer control logic 412 updates the head pointer to point to a next entry 408 according to the entry order, the head pointer will point to a next oldest data packet according to the receive order.

The FIFO queue 400 also comprises a local target information generator 414. When a data packet is received, target information in the data packet, or otherwise associated with the data packet, is received by the local target information generator 414. The target information indicates one or more targets that are to receive the data packet. In an embodiment, the target information comprises a bitmap, where each bit corresponds to a respective target, and a bit is set to one to indicate that the data packet is intended for the corresponding target whereas the bit is set to zero to indicate that the data packet is not intended for the corresponding target. In another embodiment, the target information comprises an address corresponding to one or more targets (e.g., a unicast address corresponding to a single target, a multicast address corresponding to a set of multiple targets, etc.).

In some embodiments, the target information associated with each data packet (sometimes referred to herein as "system level target information") is for identifying targets among a plurality of targets of a larger system, where the plurality of targets includes the targets 104 (FIG. 1) that are locally coupled to the router 100 as well as other targets that are not locally coupled to the router 100 (FIG. 1), e.g., targets other than the targets 104. Thus, in at least some such embodiments, the length of the system level target information (in bits) associated with each data packet is longer than necessary to identify targets among the targets 104 locally coupled to the router 100. Thus, the local target information generator 414 is configured to generate, using the system level target information, local target information that identifies targets from among the targets 104, where the local target information has a shorter length (in bits) as compared to the system level target information, according to some embodiments.

The local target information generated by the local target information generator 414 comprises a bitmap (referred to herein as "Local_Target_Vector") where each bit corresponds to a respective target 104, and a bit is set to one to indicate that the data packet is intended for the corresponding target 104 whereas the bit is set to zero to indicate that the data packet is not intended for the corresponding target 104. The local target information generator is coupled to the queue 404 and stores the local target information (e.g., the Local_Target_Vector) for a received data packet in the entry 408 in which the data packet is stored.

The FIFO queue 400 further comprises a multiplexer 432 that is coupled to the queue 404. The multiplexer 432 selects, according to control information generated by entry selection logic 436, one of the entries 408 of the queue 404 to output.

The FIFO queue 400 further comprises flow control logic 440 that receives flow control information from the targets 104 (FIG. 1), and uses the flow control information to maintain credit information for the targets 104 in a memory 444. In an embodiment, the credit information for a particular target indicates how much buffer storage is available at the particular target 104 (at least for the FIFO queue 400). In response to receiving credit update information (e.g., an example of flow control information) from a particular target 104, the flow control logic 440 increments credits (an example of credit information) for the particular target 104 stored in the memory 444 by an amount indicated by the received credit update information. As merely an illustrative example, if the credits stored in the memory 444 for a particular target 104 equal three credits, and if the flow control logic 440 receives credit update information for the particular target 104 indicating two new credits, the flow control logic 440 increments the credits stored in the memory 444 for the particular target 104 to five credits.

In some embodiments, the flow control logic 440 maintains information that indicates, for each target 104, whether there are any credits available for the target 104 (e.g., whether credits for the target 104 are non-zero). In an embodiment, the information that indicates, for each target 104, whether there are any credits available for the target 104 comprises a bitmap (referred to herein the "Credit_Available_Vector") stored in the memory 444. Each bit of the Credit_Available_Vector corresponds to a respective target 104, where a bit value of one indicates that there are a non-zero number of credits available for the corresponding target 104, and a bit value of zero indicates that there are zero credits available for the corresponding target 104.

Figure 5:
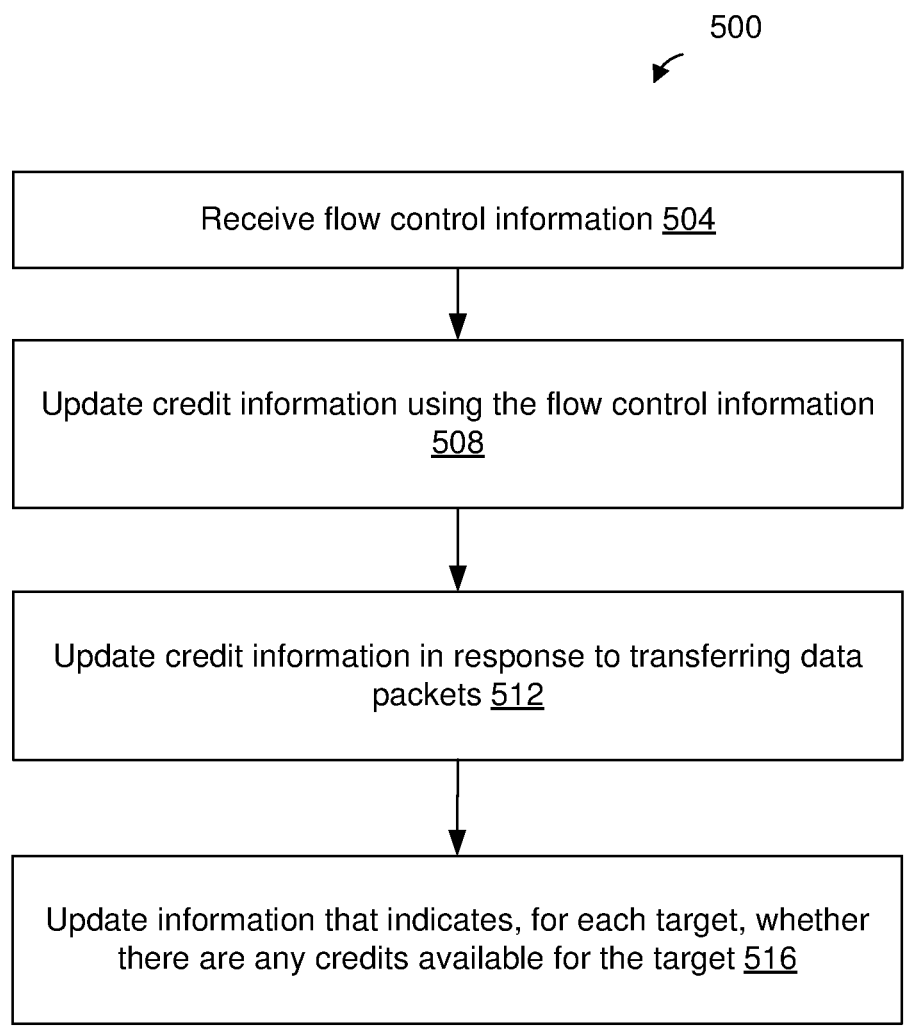
FIG. 5 is a flow diagram of an example method for maintaining flow control information in the example queue of FIG. 4, according to an embodiment.

FIG. 5 is flow diagram of an example method 500 for maintaining flow control information in a queueing system, according to an embodiment. The method 500 is implemented by the flow control logic 440, according to an embodiment, and the method 500 is described with reference to FIG. 4 for explanatory purposes. In other embodiments, however, the method 500 is implemented in another suitable queueing system and/or the flow control logic 440 implements another suitable method for maintaining flow control information.

In some embodiments, the method 500 is implemented by the queueing system (e.g., by the flow control logic 440) periodically. In other embodiments, the method 500 (or at least a portion of the method 500) is implemented by the queueing system (e.g., by the flow control logic 440) in response to an event, such as the queueing system receiving flow control information from one or more targets 104 and/or the queueing system transferring a data packet to one or more targets 104.

At block 504, the queueing system receives (e.g., the flow control logic 440 receives) flow control information from one or more targets 104. For example, the queueing system receives (e.g., the flow control logic 440 receives) credit update information from one or more targets 104.

At block 508, the queueing system uses the flow control information received at block 504 to update (e.g., the flow control logic 440 updates) credit information being maintained by the queueing system (e.g., by the flow control logic 440) for the targets 104. For example, the flow control logic 440 updates credit information in the memory 444 using credit update information received from one or more targets 104. As merely an illustrative example, if the credits stored in the memory 444 for a particular target 104 equal one credit, and if the flow control logic 440 receives credit update information for the particular target 104 indicating one new credit, the flow control logic 440 increments the credits stored in the memory 444 for the particular target 104 to two credits.

At block 512, the queueing system updates (e.g., the flow control logic 440 updates) credit information for the targets 104 in response to the queueing system transferring a packet to a target 104. For instance, as will be described further below, the entry selection logic 436 may decrement credits in the memory 444 for a particular target 104 when a data packet is transferred to the particular target 104.

At block 516, the queueing system updates (e.g., the flow control logic 440 updates) information that indicates, for each target 104, whether there are any credits available for the target 104 (e.g., whether credits for the target 104 are non-zero). For instance, the flow control logic 440 updates the Credit_Available_Vector in the memory 444. As an example, if the credits for a particular target 104 are changed, e.g., at block 508, from zero to a non-zero value, the flow control logic 440 updates the bit in the Credit_Available_Vector corresponding to the particular target 104 from zero to one. Additionally, in some embodiments, the flow control logic 440 also updates the Credit_Available_Vector when, as an example, the credits for a particular target 104 are changed from a non-zero value to zero; in particular, the flow control logic 440 updates the bit in the Credit_Available_Vector corresponding to the particular target 104 from one to zero. Accordingly, in some embodiments, block 516 is performed also in response to the FIFO queue 400 transferring a data packet to one or more targets 104 and/or in response to the FIFO queue 400 receiving transfer confirmation information, e.g., from the data distribution logic 112, that indicates the data packet was transferred to one or more targets 104.

Referring again to FIG. 4, the entry selection logic 436 receives i) local target information (e.g., the Local_Target_Vectors) from the queue 404, ii) the head pointer generated by the pointer control logic 412, and iii) credit information in the memory 444, and uses such information to generate the control information provided to the multiplexer 432. The control information generated by the entry selection logic 436 controls the multiplexer 432 to select one of the entries 408 of the queue 404 to output.

The entry selection logic 436 determines whether any intended targets 104 of the data packet in the head entry 408 are available to receive the packet. For example, the entry selection logic 436 performs a bitwise logical AND operation with the Local_Target_Vector in the head entry 408 and the Credit_Available_Vector in the memory 444 to generate a Transfer_Vector for the head entry 408 (e.g., respective bits in the Local_Target_Vector corresponding to respective targets 104 are bitwise ANDed with respective bits in the Credit_Available_Vector corresponding to respective targets 104 to generate respective bits in the Transfer_Vector corresponding to respective targets 104), according to an embodiment. Each bit in the Transfer_Vector for an entry 408 corresponds to a respective target 104 and indicates whether both i) the data packet in the entry 408 is intended for the respective target 104, and ii) the respective target 104 is available to receive the data packet.

If at least one bit in the Transfer_Vector is set to one for the head entry 408, this indicates that at least one intended target 104 of the data packet in the head entry 408 is available to receive the packet. Thus, the entry selection logic 436 generates a control signal to control the multiplexer 432 to select the head entry to output to the crossbar. Additionally, the entry selection logic 436 outputs the Transfer_Vector to the crossbar, which controls the crossbar to direct the data packet in the head entry to target(s) 104 indicated by the Transfer_Vector, e.g., the target(s) 104 that are both i) intended to receive the data packet, and ii) available to receive the data packet.

Responsive to outputting i) the data packet in the head entry 408, and ii) the Transfer_Vector to the crossbar, the entry selection logic 436 receives transfer confirmation information regarding the data packet in the head entry 408. The transfer confirmation information indicates the target(s) 104 to which the data packet in the head entry 408 was successfully transferred. In an embodiment, the transfer confirmation information comprises grant information from arbitration logic associated with the crossbar. The grant information comprises a bitmap (referred to herein as the "Grant_Vector"), with each bit corresponding to a respective target 104. When the arbitration logic grants the FIFO queue 400 access to a particular target 104, the arbitration logic sets the corresponding bit in the Grant_Vector to one, whereas when the arbitration did not grant the FIFO queue 400 access to a particular target 104, the arbitration logic sets the corresponding bit in the Grant_Vector to zero.

Upon receiving the transfer confirmation information (e.g., the Grant_Vector), the entry selection logic 436 uses the confirmation information to modify the Local_Target_Vector in the head entry 408 to indicate that the data packet in the head entry 408 has been transferred to target(s) 104 indicated by the transfer confirmation information. As an example, for each bit in the Grant_Vector set to one, the entry selection logic 436 sets a corresponding bit in the Local_Target_Vector to zero. If all bits in the Local_Target_Vector are zero, this indicates that the data packet in the head entry 408 has been transferred to all of the intended target(s) 104, and the entry selection logic 436 sets the Entry_Valid bit in the head entry 408 to zero. On the other hand, if at least one bit in the Local_Target_Vector is not zero, this indicates that there is at least one target 104 to which the data packet in the head entry 408 still needs to be transferred, and the entry selection logic 436 leaves the Entry_Valid bit in the head entry 408 at one.

On the other hand, if the entry selection logic 436 determines that there are no intended targets 104 of the data packet in the head entry 408 that are available to receive the packet (e.g., all bits in the Transfer_Vector for the head entry 408 are zero), the entry selection logic 436 selects a next entry 408 behind the head entry (according to the receive order) for which both i) the data packet still needs to be sent to at least one intended target 104, and ii) there is at least one intended target 104 that is available to receive the data packet. For example, the entry selection logic 436 selects a next entry 408 behind the head entry (according to the receive order) for which both i) the Entry_Valid bit is set to one, and ii) at least one bit in a Transfer_Vector for the entry 408 is set to one, according to an embodiment. The entry selection logic 436 performs a bitwise logical AND operation with the Local_Target_Vector for the entry 408 and the Credit_Available_Vector in the memory 444 to generate a Transfer_Vector for the entry 408 (e.g., respective bits in the Local_Target_Vector corresponding to respective targets 104 are bitwise ANDed with respective bits in the Credit_Available_Vector corresponding to respective targets 104 to generate respective bits in the Transfer_Vector corresponding to respective targets 104), according to an embodiment. Each bit in the Transfer_Vector for the entry 408 corresponds to a respective target 104 and indicates whether both i) the data packet in the entry 408 is intended for the respective target 104, and ii) the respective target 104 is available to receive the data packet.

Thus, the entry selection logic 436 generates a control signal to control the multiplexer 432 to select, as an output to the crossbar, the next entry 408 behind the head entry (according to the receive order) for which both i) the data packet still needs to be sent to at least one intended target 104, and ii) there is at least one intended target 104 that is available to receive the data packet. Additionally, the entry selection logic 436 outputs the Transfer_Vector for the selected entry 408 to the crossbar, which controls the crossbar to direct the data packet in the selected entry 408 to target(s) 104 indicated by the Transfer_Vector, e.g., the target(s) 104 that are both i) intended to receive the data packet, and ii) available to receive the data packet.

Responsive to outputting i) the data packet in the selected entry 408, and ii) the Transfer_Vector to the crossbar, the entry selection logic 436 receives transfer confirmation information regarding the data packet in the selected entry 408. The transfer confirmation information indicates the target(s) 104 to which the data packet in the selected entry 408 was successfully transferred. In an embodiment, the transfer confirmation information comprises grant information from arbitration logic associated with the crossbar. The grant information comprises the Grant_Vector discussed above, according to an embodiment.

Upon receiving the transfer confirmation information (e.g., the Grant_Vector), the entry selection logic 436 uses the confirmation information to update credit information in the memory 444 for target(s) to which the data packet was transferred. As an example, for each bit in the Grant_Vector set to one, the entry selection logic 436 decrements credits for a corresponding target 104 in the memory 444. As merely an illustrative example, if credits in the memory for a particular target 104 are set to four, and a bit in the Grant_Vector corresponding to the particular target 104 is set to the one, the entry selection logic 436 decrements the credits in the memory for the particular target 104 to three.

Also upon receiving the transfer confirmation information (e.g., the Grant_Vector), the entry selection logic 436 uses the confirmation information to modify the Local_Target_Vector in the selected entry 408 to indicate that the data packet in the selected entry 408 has been transferred to target(s) 104 indicated by the transfer confirmation information. As an example, for each bit in the Grant_Vector set to the one, the entry selection logic 436 sets a corresponding bit in the Local_Target_Vector to zero. If all bits in the Local_Target_Vector are zero, this indicates that the data packet in the selected entry 408 has been transferred to all of the intended target(s) 104, and the entry selection logic 436 sets the Entry_Valid bit in the selected entry 408 to zero. On the other hand, if at least one bit in the Local_Target_Vector is not zero, this indicates that there is at least one target 104 to which the data packet in the selected entry 408 still needs to be transferred, and the entry selection logic 436 leaves the Entry_Valid bit in the selected entry 408 at one.

Figure 6:
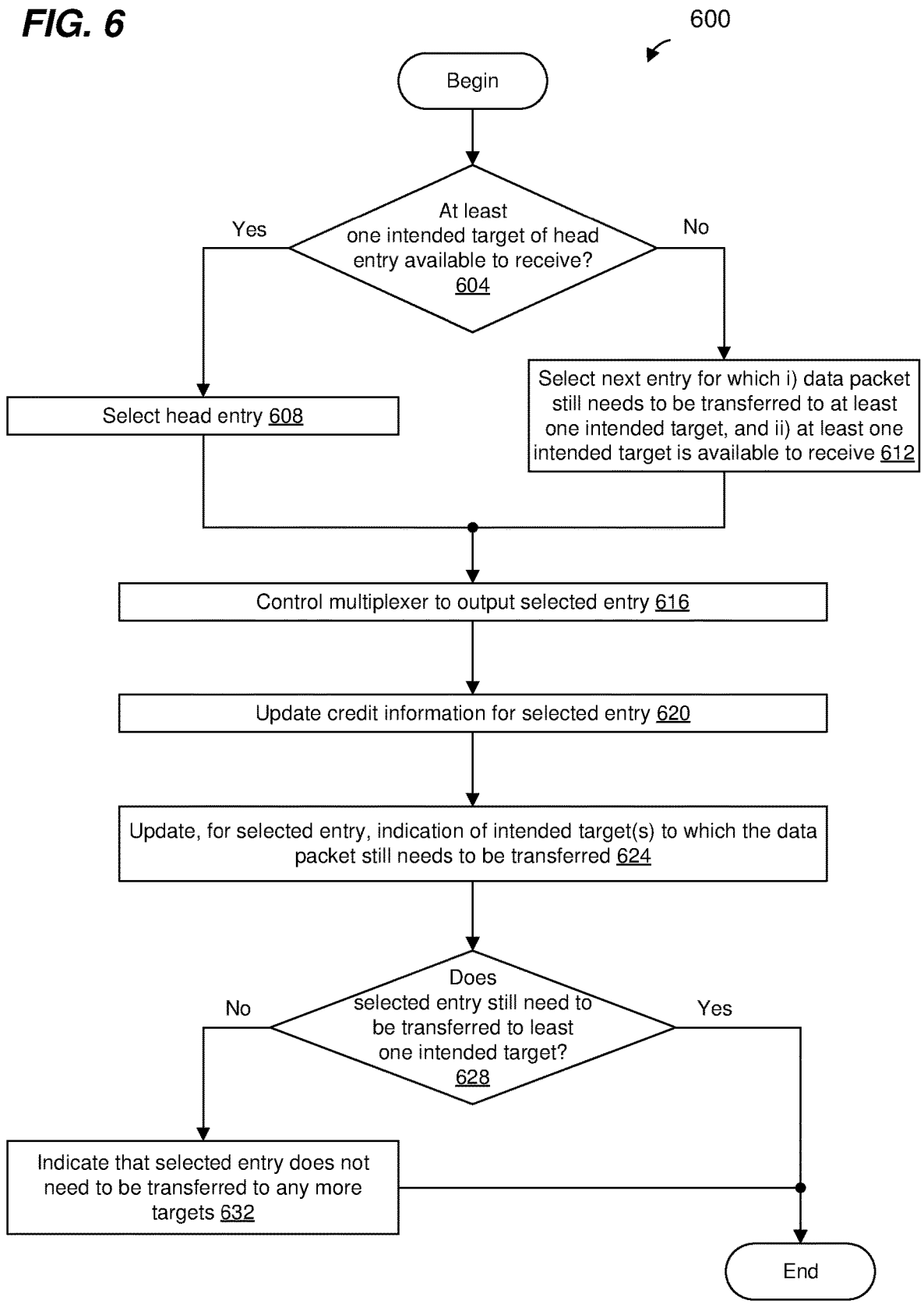
FIG. 6 is a flow diagram of an example method for transferring a data packet from the example queue of FIG. 4, according to an embodiment.

FIG. 6 is flow diagram of an example method 600 for transferring a data packet from a queue, according to an embodiment. The method 600 is implemented by the entry selection logic 436 of FIG. 4, according to an embodiment, and the method 600 is described with reference to FIG. 4 for explanatory purposes. In other embodiments, however, the method 600 is implemented in another suitable queueing system and/or the entry selection logic 436 implements another suitable method for transferring a data packet from a queue.

At block 604, the queuing system determines (e.g., the entry selection logic 436 determines) whether at least one intended target of a data packet in a head entry of a queue is available to receive the data packet. For example, the entry selection logic 436 performs a bitwise logical AND operation with the Local_Target_Vector in the head entry 408 and the Credit_Available_Vector in the memory 444 to generate the Transfer_Vector for the head entry 408, and determines whether at least one bit in the Transfer_Vector is set to one. If at least one bit in the Transfer_Vector for the head entry is set to one, this indicates that at least one intended target 104 of the data packet in the head entry 408 is available to receive the packet. On the other hand, if no bits in the Transfer_Vector for the head entry are set to one, this indicates that no intended targets 104 of the data packet in the head entry 408 are available to receive the packet.

If the queuing system determines (e.g., the entry selection logic 436 determines) at block 604 that at least one intended target of the data packet in the head entry is available to receive the data packet, the flow proceeds to block 608. At block 608, the queuing system selects (e.g., the entry selection logic 436 selects) the head entry in the queue.

On the other hand, if the queuing system determines (e.g., the entry selection logic 436 determines) at block 604 that no intended targets of the data packet in the head entry are available to receive the data packet, the flow proceeds to block 612.

At block 612, the queuing system selects (e.g., the entry selection logic 436 selects) a next entry in the queue (according to an order in which packets stored in the queue were received (i.e., a receive order), which corresponds to an order of entries in the queue (i.e., an entry order)) for which i) a data packet in the entry still needs to be transferred to at least one intended target, and ii) at least one intended target of the data packet in the entry is available to receive the data packet. For example, the entry selection logic 436 chooses a next entry 408 (according to the receive order) for which the Entry_Valid bit is set to one, and performs a bitwise logical AND operation with the Local_Target_Vector in the chosen entry 408 and the Credit_Available_Vector in the memory 444 to generate the Transfer_Vector for the chosen entry 408, and determines whether at least one bit in the Transfer_Vector is set to one. If at least one bit in the Transfer_Vector for the chosen entry 408 is set to one, the entry selection logic 436 selects the entry 408. On the other hand, if no bits in the Transfer_Vector for the chosen entry 408 are set to one, this indicates that no intended targets 104 of the data packet in the chosen entry 408 are available to receive the packet, and the entry selection logic 436 chooses a next entry 408 (according to the receive order) for which the Entry_Valid bit is set to one. Similarly, the entry selection logic 436 performs a bitwise logical AND operation with the Local_Target_Vector in the next chosen entry 408 and the Credit_Available_Vector in the memory 444 to generate the Transfer_Vector for the next chosen entry 408, and determines whether at least one bit in the Transfer_Vector is set to one. If at least one bit in the Transfer_Vector for the next chosen entry 408 is set to one, the entry selection logic 436 selects the entry 408. On the other hand, if no bits in the Transfer_Vector for the chosen entry 408 are set to one, this indicates that no intended targets 104 of the data packet in the chosen entry 408 are available to receive the packet, and the entry selection logic 436 chooses a next entry 408 (according to the receive order) for which the Entry_Valid bit is set to one, and so on.

At block 616, the entry selection logic 436 generates a control signal to control the multiplexer 432 to select to output to the crossbar the entry selected at block 608 or block 612. Additionally, according to some embodiments, the entry selection logic 436 outputs the Transfer_Vector for the selected entry to the crossbar, which controls the crossbar to direct the data packet in the selected entry to target(s) 104 indicated by the Transfer_Vector, e.g., the target(s) 104 that are both i) intended to receive the data packet, and ii) available to receive the data packet.

At block 620, the entry selection logic 436 updates credit information in the memory 444 for targets to which the data packet in the selected entry 408 was transferred. For example, upon receiving the transfer confirmation information (e.g., the Grant_Vector), the entry selection logic 436 uses the confirmation information to update credit information in the memory 444 for target(s) to which the data packet was transferred. As merely an illustrative example, if credits in the memory for a particular target 104 are set to three, and a bit in the Grant_Vector corresponding to the particular target 104 is set to one, the entry selection logic 436 decrements the credits in the memory for the particular target 104 to two.

At block 624, the entry selection logic 436 updates, for the entry selected at block 608 or block 612, an indication of intended target(s) to which the data packet needs to be transferred. For example, if the data packet was transferred (in connection with block 616) to a particular target 104, the indication of intended targets for the selected entry is updated to indicate that the data packet does not need to be transferred to the particular target 104. For instance, upon receiving the transfer confirmation information (e.g., the Grant_Vector), the entry selection logic 436 uses the confirmation information to modify the Local_Target_Vector in the selected entry 408 to indicate that the data packet in the selected entry 408 has been transferred to target(s) 104 indicated by the transfer confirmation information. As an example, for each bit in the Grant_Vector set to one, the entry selection logic 436 sets a corresponding bit in the Local_Target_Vector to zero.

At block 628, the entry selection logic 436 determines when the data packet in the entry selected at block 608 or block 612 still needs to be transferred to at least one intended target. For example, the entry selection logic 436 processes the Local_Target_Vector for the selected entry 408 to determine whether any bits in the Local_Target_Vector are set to the one. If all bits in the Local_Target_Vector are set to zero, this indicates that the data packet in the selected entry 408 has been transferred to all of the intended target(s) 104. On the other hand, if at least one bit in the Local_Target_Vector is not zero, this indicates that there is at least one target 104 to which the data packet in the selected entry 408 still needs to be transferred.

If the entry selection logic 436 determines, at block 628, that the data packet in the entry selected at block 608 or block 612 does not need to be transferred to any more intended targets, the flow proceeds to block 632. At block 632, the entry selection logic 436 sets the Entry_Valid bit in the selected entry 408 to zero to indicate that the data packet in the selected entry 408 does not need to be transferred to any more intended targets.

Referring again to FIG. 4, in connection with the data packet in the head entry having been transferred to all intended target(s), the pointer control logic 412 determines, using Entry_Valid bits in the queue 404, a next entry 408 (according to the order of entries 408, i.e., the entry order) that has not yet been transferred to all intended target(s), and updates the head pointer to point to the determined next entry 408, according to an embodiment. As an illustrative example, in response to the pointer control logic 412 determining that the Entry_Valid bit of the entry 408 to which the head pointer currently points has been changed to zero, the pointer control logic 412 changes the head pointer to point to a next entry (according to the order of entries 408, i.e., the entry order) for which the Entry_Valid bit is set to one, according to an embodiment.

Although bits were described above as being set to a particular value (e.g., zero or one), in other embodiments similar operations are performed by setting bits to a different value, with associated logic being modified accordingly.

Referring now to FIGS. 1-6, although queueing systems storing and transferring data packets were described above, similar queueing systems store and transfer other suitable types of packets, such as instruction packets, in addition to, or as an alternative to, storing and transferring data packets, according to some embodiments. Instruction packets include information corresponding to machine readable instructions that, when executed by a processor, cause the processor to perform various acts corresponding to the machine readable instructions, in an embodiment.

Figure 7:
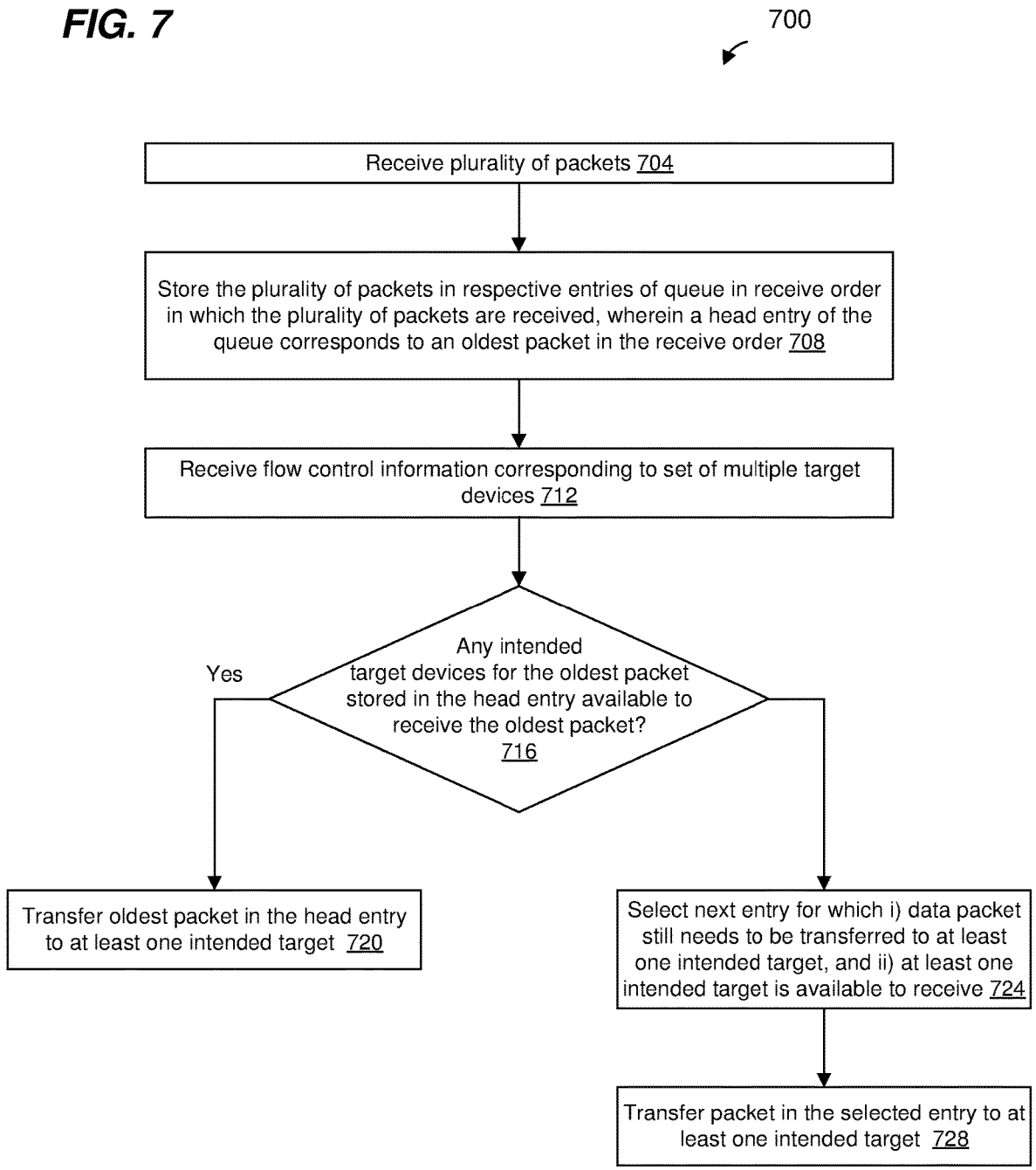
FIG. 7 is a flow diagram of an example method, implemented by the data distribution node of FIG. 1, the queue of FIG. 2, and/or the queue of FIG. 4, for transferring packets to a set of multiple target devices, according to an embodiment.

FIG. 7 is flow diagram of an example method 700 for transferring packets to a set of multiple target devices, according to an embodiment. The method 700 is implemented by the router 100 of FIG. 1, the FIFO queue 200 of FIG. 2, and/or the FIFO queue 400 of FIG. 4, according to various embodiments, and the method 500 is described with reference to FIGS. 1, 2, and 4 for explanatory purposes. In other embodiments, however, the method 700 is implemented in another suitable queueing system and/or the router 100 of FIG. 1, the FIFO queue 200 of FIG. 2, and/or the FIFO queue 400 of FIG. 4 implement another suitable method for transferring packets to a set of multiple target devices. In some embodiments, the method 700 optionally includes performing one or both of the method 500 (FIG. 5) and/or the method 600 (FIG. 6).

At block 704, a plurality of packets are received by the queueing system. For example, the router 100 receives the plurality of packets, in an embodiment. As another example, the FIFO queue 200 receives the plurality of packets, in another embodiment. As yet another example, the FIFO queue 400 receives the plurality of packets, in yet another embodiment. In some embodiments, the plurality of packets are received from a single source device. In other embodiments, the plurality packets are received from multiple source devices.

At block 708, the queueing system stores plurality of packets received at block 704 in respective entries of a queue in an order in which the plurality of packets were received (i.e., the "receive order") at block 704. A head entry of the queue corresponds to an oldest packet in the receive order.

For example, the plurality of packets are stored in the FIFO queue 108, in an embodiment. As another example, the plurality of packets are stored in the queue 204, in another embodiment. As yet another example, the plurality of packets are stored in the queue 404, in yet another embodiment.

At block 712, the queueing system receives flow control information corresponding to the set of multiple target devices, the flow control information indicating whether one or more target devices, among the set of multiple target devices, are available to receive packets from the queueing system. In some embodiments, the flow control information received at block 712 comprises credit information corresponding to the one or more target devices. In some embodiments, the flow control information received at block 712 comprises credit update information corresponding to the one or more target devices. In some embodiments, the flow control information received at block 712 comprises one or more respective pause signals corresponding to the one or more target devices.

For example, the FIFO queue 108 receives the flow control information, in an embodiment. As another example, the entry selection logic 236 receives the flow control information, in another embodiment. As yet another example, the entry selection logic 436 receives the flow control information, in yet another embodiment.

At block 716, the queueing system determines, using the flow control information received at block 712, whether any target devices for which the oldest packet stored in the head entry is available to receive the oldest packet. For example, the FIFO queue 108 uses the flow control information to determine any target devices for which the oldest packet stored in the head entry is available to receive the oldest packet, in an embodiment. As another example, the entry selection logic 236 uses the flow control information to determine whether any target devices for which the oldest packet stored in the head entry is available to receive the oldest packet, in another embodiment. As yet another example, the entry selection logic 436 uses the flow control information to determine whether any target devices for which the oldest packet stored in the head entry is available to receive the oldest packet, in another embodiment.

If it is determined, at block 716, that at least one target device for which the oldest packet stored in the head entry is available to receive the oldest packet, the flow proceeds to block 720. At block 720, the oldest packet stored in the head entry is transferred to the at least one intended target of the data packet that is available to receive the data packet. For example, transferring the oldest packet at block 720 comprises the FIFO queue 108 transferring the oldest packet to one or more targets via the data distribution logic 112, according to an embodiment.

As another example, transferring the oldest packet at block 720 comprises the entry selection logic 236 controlling the multiplexer 232 to select the head entry for output and/or the FIFO queue 200 transferring the oldest packet to one or more targets via the data distribution logic 112, according to another embodiment. As yet another example, transferring the oldest packet at block 720 comprises the entry selection logic 436 controlling the multiplexer 432 to select the head entry for output and/or the FIFO queue 400 transferring the oldest packet to one or more targets via the data distribution logic 112, according to yet another embodiment.

On the other hand, if it is determined, at block 716, that no target devices for which the oldest packet stored in the head entry is available to receive the oldest packet, the flow proceeds to block 724. At block 724, the queueing system selects another entry behind the head entry according to the receive order, the other entry storing another packet that can be transferred to a target that is available to receive the other packet. In an embodiment, selecting another entry at block 724 comprises selecting another entry that includes a data packet i) that still needs to be transferred to at least one intended target, and ii) for which at least one intended target of the data packet is available to receive the data packet.

As an example, selecting the other entry behind the head entry at block 724 comprises the FIFO queue 108 selecting the other entry behind the head entry, according to an embodiment. As another example, selecting the other entry behind the head entry at block 724 comprises the entry selection logic 236 controlling the multiplexer 232 to select the other entry behind the head entry, according to another embodiment. As yet another example, selecting the other entry behind the head entry at block 724 comprises the entry selection logic 436 controlling the multiplexer 432 to select the other entry behind the head entry, according to yet another embodiment.

At block 728, the queueing system transfers the other packet in the entry selected at block 724 to at least one intended target of the data packet that is available to receive the data packet. For example, transferring the packet at block 728 comprises the FIFO queue 108 transferring the packet to one or more targets via the data distribution logic 112, according to an embodiment. As another example, transferring the packet at block 728 comprises the FIFO queue 200 transferring the packet to one or more targets via the data distribution logic 112, according to another embodiment. As another example, transferring the packet at block 728 comprises the FIFO queue 400 transferring the packet to one or more targets via the data distribution logic 112, according to another embodiment.

Figure 8:
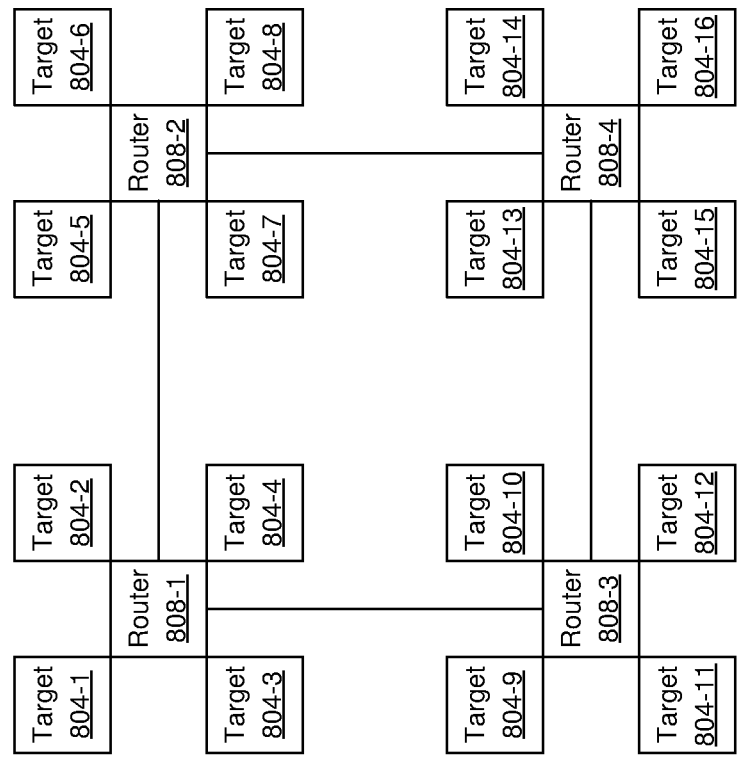
FIG. 8 is a simplified diagram of an example mesh architecture in which the data distribution node of FIG. 1, the queue of FIG. 2, and/or the queue of FIG. 4, is utilized, according to an embodiment.

FIG. 8 is a diagram of an example mesh architecture 800 in which queueing systems and methods described above with reference to FIGS. 1-7 may be utilized, according to an embodiment. The example mesh architecture 800 is merely one example of a processing system that utilizes queueing systems and methods described herein. The queueing systems and methods described above with reference to FIGS. 1-7 may be utilized in a variety of different systems in which packets need to be transmitted to multiple target devices, according to various other embodiments.

The mesh architecture 800 includes a plurality of target devices 804 communicatively coupled together via a plurality of routers 808. Each of one or more of the target devices 804 comprises a processing node, according to an embodiment. Additionally or alternatively, each of one or more of the target devices 804 comprises a memory device such as a DMA device, according to another embodiment.

In some embodiments in which one or more target devices 804 comprise a processing node, each processing node comprises at least an on-chip memory (OCM) and one or more processing units of a same type (in one embodiment) or of a different type (in another embodiment). In embodiments in which one or more target devices 804 comprises an OCM and one or more processing units, each OCM comprises one or more memory banks and is configured to accept and maintain data in a streaming fashion for access by the processing unit(s) for various operations performed by the processing unit(s). In such embodiments, the OCMs enable efficient local access to data by the processing unit(s).

Although the target devices 804 are referred to as "targets", each of at least some of the target devices 804 may also act as a source of packets for other target devices 804.

Each router 808 is associated with one or more target devices 804. Although FIG. 8 depicts each router 808 being associated with four target devices 804, in various other embodiments each router 808 is associated with another suitable number of target devices 804, such as one, two, three, five, six, etc. Although FIG. 8 depicts each router 808 being associated with a same number of target devices 804 (e.g., four), in various other embodiments each of at least some routers 808 are associated with different numbers of target devices 804.

In some embodiments, each router 808 has a structure the same as or similar to the router 100 of FIG. 1, or another suitable structure. In various embodiments, each router 808 includes a queueing system such as the queueing system 200 of FIG. 2 or the queueing system 400 of FIG. 4. In other embodiments, each router 808 includes another suitable queueing system.

Although FIG. 8 depicts four routers 808, the mesh architecture 800 includes other suitable numbers of routers 808 in various other embodiments.

Each router 808 is coupled to the targets 804 associated therewith, and is also coupled to one or more other routers 808. For example, the router 808-1 is coupled to targets 804-1, 804-2, 804-3, and 804-4, as well as routers 808-2 and 808-3. In some embodiments, the router 808-1 is also coupled to the router 808-4.

Figure 9:
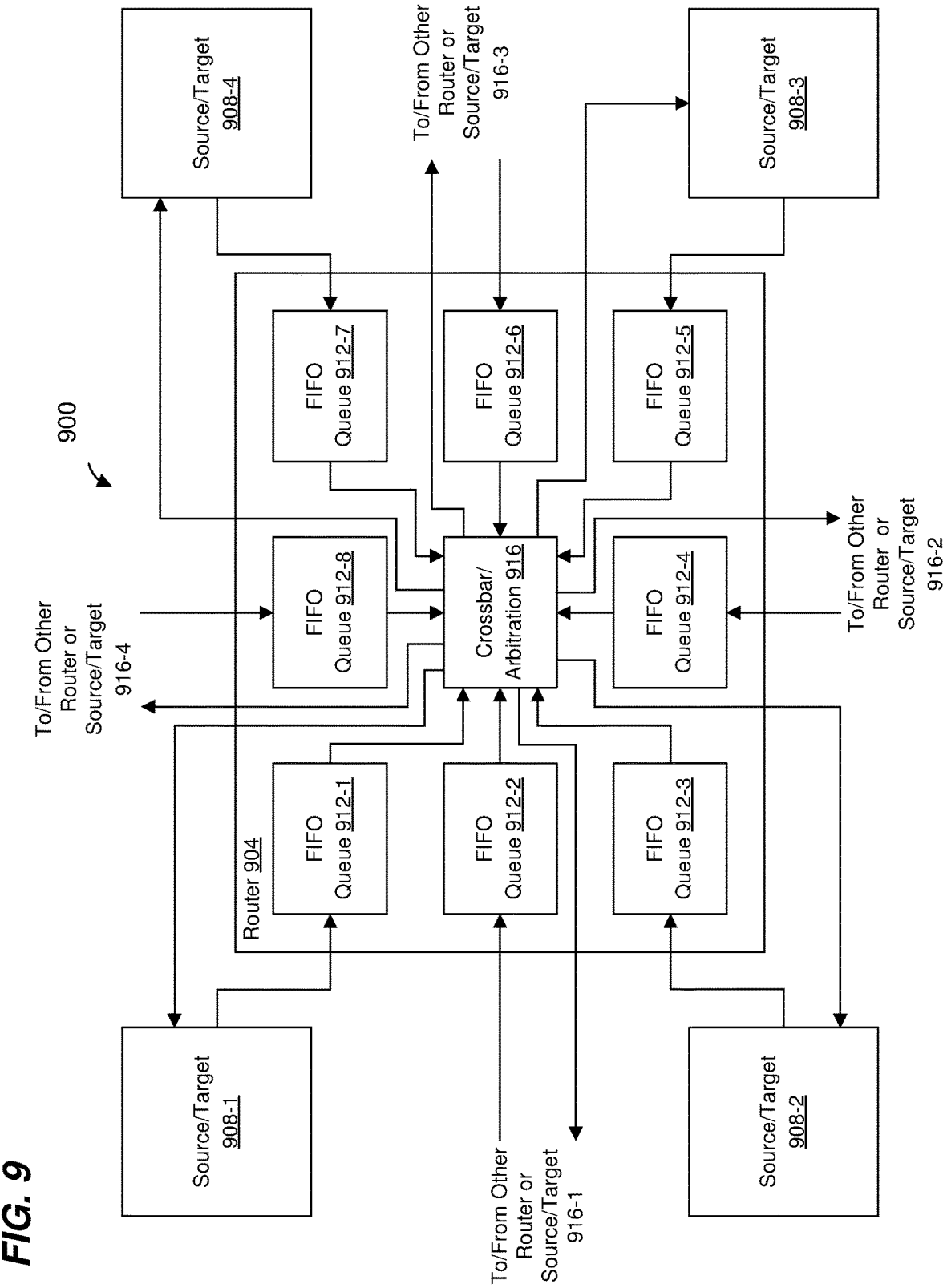
FIG. 9 is a simplified diagram of an example processing subsystem included in the example mesh architecture of FIG. 8, according to an embodiment.

FIG. 9 is a diagram of an example processing subsystem 900 that includes an example router 904, according to an embodiment. The processing subsystem 900 is included in the example mesh architecture 800 of FIG. 8, according to an embodiment, and FIG. 9 is described with reference to FIG. 8 for explanatory purposes. In other embodiments, the processing subsystem 900 is used in another suitable processing system, such as another machine learning system, a parallel processing system, an image processing system, etc.

The router 904 is an example of at least some of the routers 808 described with reference to FIG. 8, according to an embodiment. The router 904 is coupled to a plurality of source/target devices 908. The source/target devices 908 correspond to at least some of the target devices 804 described with reference to FIG. 8, according to an embodiment.

The router 904 is also coupled to one or more other routers (not shown in FIG. 9) and/or one or more other source/target devices 916. One or more (or none) of other routers 916 have a structure the same as or similar to the router 904, according to some embodiments. One or more of other routers or source/target devices 916 correspond to the routers 808 described with reference to FIG. 8, and/or to at least some of the target devices 804 associated with other routers 808 described with reference to FIG. 8, according to various embodiments.

The router 904 comprises a plurality of FIFO queues 912 each having head-of-line blocking avoidance logic (each FIFO queue 912 with head-of-line blocking avoidance logic referred to herein as "the FIFO queue 912" for brevity). In various embodiments, each FIFO queue 912 corresponds to the FIFO queue 108 (FIG. 1), the FIFO queue 200 (FIG. 2), and/or the FIFO queue 400 (FIG. 4). In various embodiments, at least one FIFO queue 912 is configured to implement at least one of the methods described with reference to FIGS. 5-7.

FIFO queues 912-1, 912-3, 912-5, and 912-7 are respectively coupled to source/target devices 908-1, 908-2, 908-3, and 908-4. FIFO queues 912-2, 912-4, 912-6, and 912-8 are coupled to a respective other router or source/target device 916. Source/target device 908-1 acts as a source for FIFO queue 912-1, source/target device 908-2 acts as a source for FIFO queue 912-3, source/target device 908-3 acts as a source for FIFO queue 912-5, and source/target device 908-1 acts as a source for FIFO queue 912-7. The other router (or source/target device) 916-1 acts as a source for FIFO queue 912-2, the other router (or source/target device) 916-2 acts as a source for FIFO queue 912-4, the other router (or source/target device) 916-3 acts as a source for FIFO queue 912-6, and the other router (source/target device) 916-4 acts as a source for FIFO queue 912-8.

Source/target devices 908-2, 908-3, 908-4, and the other routers (or source/target devices) 916 act as targets for the FIFO queue 912-1. Source/target devices 908-1, 908-3, 908-4, and the other routers (or source/target devices) 916 act as targets for the FIFO queue 912-3. Source/target devices 908-1, 908-2, 908-4, and the other routers (or source/target devices) 916 act as targets for the FIFO queue

912-5. Source/target devices 908-1, 908-2, 908-3, and the other routers (or source/target devices) 916 act as targets for the FIFO queue 912-7.

Source/target devices 908 and other routers (or source/target devices) 916-2, 916-3, and 916-4 act as targets for the FIFO queue 912-2. Source/target devices 908 and other routers (or source/target devices) 916-1, 916-3, and 916-4 act as targets for the FIFO queue 912-4. Source/target devices 908 and other routers (or source/target devices) 916-1, 916-2, and 916-4 act as targets for the FIFO queue 912-6. Source/target devices 908 and other routers (or source/target devices) 916-1, 916-2, and 916-3 act as targets for the FIFO queue 912-8.

Embodiment 1: An apparatus, comprising: a queue including a plurality of entries, the plurality of entries including a head entry; and control logic circuitry configured to: store packets received by the apparatus in the queue in an order in which the packets are received until the packets can be transferred to a plurality of target devices, wherein the head entry corresponds to an oldest packet in the order. The control logic circuitry is also configured to: receive flow control information corresponding to the plurality of target devices, the plurality of target devices including at least a first target device and a second target device, determine, using the flow control information, whether the oldest packet stored in the head entry can be transferred to the first target device, and in response to determining that the oldest packet stored in the head entry cannot be transferred to the first target device, i) select an other entry behind the head entry according to the order, the other entry storing an other packet that can be transferred to the second target device, and ii) transfer the other packet to the second target device prior to transferring the oldest packet in the head entry to the first target device.

Embodiment 2: The apparatus of embodiment 1, wherein: the control logic circuitry comprises a multiplexer having i) a plurality of inputs respectively coupled to the plurality of entries of the queue; and the control logic circuitry is configured to control the multiplexer to select an input of the multiplexer that is coupled to the other entry behind the head entry to output from the multiplexer.

Embodiment 3: The apparatus of either of embodiments 1 or 2, wherein the control logic circuitry is configured to: determine one or more target devices, among the set of multiple target devices, for which the oldest packet stored in the head entry is intended, the one or more target devices including the first target device; determine, using the flow control information, whether at least one of the one or more target devices is available to receive the oldest packet; and in response to determining that none of the target devices in the one or more target devices is available to receive the oldest packet, i) select the other entry behind the head entry, and ii) transfer the other packet to the second target device prior to transferring the oldest packet in the head entry to any of the one or more target devices.

Embodiment 4: The apparatus of embodiment 3, wherein the control logic circuitry is configured to: in response to determining that at least the first target device is available to receive the oldest packet, i) select the head entry, and ii) transfer the oldest packet to the at least the first target device prior to transferring the other packet to the second target device.

Embodiment 5: The apparatus of embodiment 4, wherein the control logic circuitry is configured to: in connection with transferring the oldest packet to the at least the first target device, determine whether the oldest packet is still to be transmitted to one or more additional target devices; in response to determining that the oldest packet is still to be transmitted to one or more additional target devices, keep a head pointer pointing at the head entry corresponding to the oldest packet; and in response to determining that the oldest packet does not need to be transmitted to any additional target devices, update the head pointer to point at a different entry corresponding to a different packet that is behind the oldest packet according to the order.

Embodiment 6: The apparatus of any of embodiments 1-5, wherein the control logic circuitry is configured to: in response to determining that the oldest packet stored in the head entry can be transferred to the first target device, transfer the oldest packet to the first target prior to transferring the other packet in the other entry to the second target device.

Embodiment 7: The apparatus of embodiment 6, wherein the control logic circuitry is configured to: in connection with transferring the oldest packet to the first target device, update the head pointer to point at a different entry corresponding to a different packet that is behind the oldest packet according to the order.

Embodiment 8: The apparatus of embodiment 7, wherein the control logic circuitry is configured to, as part of updating the head pointer: determine a next entry, according to the order, that includes a packet that still needs to be transferred to at least one target device; and update the head pointer to point at the determined next entry.

Embodiment 9: The apparatus of embodiment 8, wherein the control logic circuitry is configured to, as part of determining the next entry, according to the order, that includes the packet that still needs to be transferred to at least one target device: skip over one or more entries, according to the order, that include packets that do not need to be transferred to any target devices.

Embodiment 10: The apparatus of any of embodiments 1-9, further comprising: a crossbar communicatively coupled to the queue; wherein the control circuitry is configured to: provide the other packet to the crossbar, and provide destination information to crossbar, the destination information controlling the crossbar to transfer the other packet to the second target device.

Embodiment 11: A method for transferring packets to a set of multiple target devices, the method comprising: receiving a plurality of packets; storing the plurality of packets in respective entries of a queue in an order in which the plurality of packets were received, wherein a head entry of the queue corresponds to an oldest packet in the order; receiving flow control information corresponding to the set of multiple target devices, the flow control information indicating whether one or more target devices, among the set of multiple target devices, are available to receive packets; determining, using the flow control information, whether any target devices for which the oldest packet is intended is available to receive the oldest packet; and in response to determining that no target devices for which the oldest packet is intended are available to receive the oldest packet, selecting an other entry, behind the head entry according to the order, that stores an other packet intended for at least one target device that is available to receive the other packet, and transferring the other packet in the other entry, behind the head entry according to the order, to at least one target device for which the other packet is intended prior to transferring the oldest packet in the head entry to a target device for which the oldest packet is intended.

Embodiment 12: The method of embodiment 11, wherein transferring the other packet in the other entry, behind the head entry in the order, comprises: transferring the other packet in the other entry while keeping a head pointer of the queue pointed at the head entry.

Embodiment 13: The method of either of embodiments 11 or 12, further comprising: in response to determining that at least one target device for which the oldest packet is available to receive the oldest packet, transferring the oldest packet to at least one target device for which the oldest packet is intended prior to transferring the other packet in the other entry to a target device for which the other packet is intended.

Embodiment 14: The method of embodiment 13, further comprising: in connection with transferring the oldest packet to the at least one target device for which the oldest packet is intended, determining whether the oldest packet is still to be transmitted to one or more additional target devices; in response to determining that the oldest packet is still to be transmitted to one or more additional target devices, keeping a head pointer pointing at the head entry corresponding to the oldest packet; and in response to determining that the oldest packet does not need to be transmitted to any additional target devices, updating the head pointer to point at a different entry corresponding to a different packet that is behind the oldest packet according to the order.

Embodiment 15: The method of embodiment 14, wherein updating the head pointer comprises: in connection with transferring the oldest packet to the at least one target device for which the oldest packet is intended, determining whether the oldest packet is still to be transmitted to one or more additional target devices; in response to determining that the oldest packet is still to be transmitted to one or more additional target devices, keeping a head pointer pointing at the head entry corresponding to the oldest packet; and in response to determining that the oldest packet does not need to be transmitted to any additional target devices, updating the head pointer to point at a different entry corresponding to a different packet that is behind the oldest packet according to the order.

Embodiment 16: The method of embodiment 15, wherein updating the head pointer comprises: determine a next entry, according to the order, that includes a packet that still needs to be transferred to at least one target device; and update the head pointer to point at the determined next entry.

Embodiment 17: The method of embodiment 16, wherein updating the head pointer comprises: skipping over one or more entries, according to the order, that include packets that do not need to be transferred to any target devices.

Embodiment 18: The method of any of embodiments 11-17, wherein: receiving flow control information corresponding to the set of multiple target devices comprises receiving flow control credit update information corresponding to the set of multiple target devices; the method further comprises maintaining flow control credits for the set of multiple target devices; and determining whether any target devices for which the oldest packet is intended is available to receive the oldest packet comprises: for each target device for which the oldest packet is intended, determining whether there is a non-zero amount of credits for the target device, and determining that no target devices for which the oldest packet is intended are available to receive the oldest packet in response to determining that all of the target devices for which the oldest packet is intended have zero credits.

Embodiment 19: The method of any of embodiments 11-18, further comprising: generating control information that indicates one or more target devices that are both i) intended to receive the other packet, and ii) available to receive the other packet; wherein transferring the other packet comprises using the control information to transfer the other packet to the one or more target devices that are both i) intended to receive the other packet, and ii) available to receive the other packet.

Embodiment 20: The method of embodiment 19, wherein transferring the other packet comprises: providing the other packet to a crossbar that is coupled to the set of multiple target devices; and providing the control information to the crossbar to control the crossbar to transfer the other packet to the one or more target devices that are both i) intended to receive the other packet, and ii) available to receive the other packet.

At least some of the various blocks, operations, and techniques described above may be implemented utilizing hardware, a processor executing firmware instructions, a processor executing software instructions, or any combination thereof When implemented utilizing a processor executing software or firmware instructions, the software or firmware instructions may be stored in any computer readable memory such as in a RAM, a ROM, a flash memory, an integrated memory of a processor, etc. The software or firmware instructions may include machine readable instructions that, when executed by the processor, cause the processor to perform various acts.

When implemented in hardware, the hardware may comprise one or more of discrete components, one or more ICs, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An apparatus, comprising:
  a queue including a plurality of entries, the plurality of entries including a head entry; and
  control logic circuitry configured to:
    store packets received by the apparatus in the queue in an order in which the packets are received until the packets can be transferred to a plurality of target devices, wherein the head entry corresponds to an oldest packet in the order, and wherein the plurality of target devices includes a first target device, a second target device, and a third target device,
    determine that the oldest packet is intended for multiple target devices among the plurality of target devices, the multiple target devices including the first target device and the second target device,
    receive flow control information corresponding to the plurality of target devices,
    determine, using the flow control information, whether the oldest packet stored in the head entry can be transferred to any of the target devices among the multiple target devices,
    in response to determining that the oldest packet stored in the head entry can be transferred to the first target device and cannot be transferred to the second target device, transfer the oldest packet to the first target and maintain the oldest packet as the head entry, and
    in response to determining that the oldest packet stored in the head entry cannot be transferred to any target device among the multiple target devices, i) select an other entry behind the head entry according to the order, the other entry storing an other packet that can be transferred to the third target device, and ii) transfer the other packet to the third target device prior to transferring the oldest packet in the head entry to any target device among the multiple target devices.

2. The apparatus of claim 1, wherein:
the control logic circuitry comprises a multiplexer having a plurality of inputs respectively coupled to the plurality of entries of the queue; and
the control logic circuitry is configured to control the multiplexer to select an input of the multiplexer that is coupled to the other entry behind the head entry to output from the multiplexer.

3. The apparatus of claim 1, wherein the control logic circuitry is configured to:
determine the multiple target devices for which the oldest packet stored in the head entry is intended;
determine, using the flow control information, whether at least one of the multiple target devices is available to receive the oldest packet; and
in response to determining that none of the target devices in the multiple target devices is available to receive the oldest packet, i) select the other entry behind the head entry, and ii) transfer the other packet to the second target device prior to transferring the oldest packet in the head entry to any of the one or more target devices.

4. The apparatus of claim 3, wherein the control logic circuitry is configured to:
in response to determining that at least the first target device is available to receive the oldest packet, i) select the head entry, and ii) transfer the oldest packet to the at least the first target device prior to transferring the other packet to the second target device.

5. The apparatus of claim 4, wherein the control logic circuitry is configured to:
in connection with transferring the oldest packet to the at least the first target device, determine whether the oldest packet is still to be transmitted to one or more additional target devices;
in response to determining that the oldest packet is still to be transmitted to one or more additional target devices, keep a head pointer pointing at the head entry corresponding to the oldest packet after transferring the oldest packet to the at least the first target device; and
in response to determining that the oldest packet does not need to be transmitted to any additional target devices, update the head pointer to point at a different entry corresponding to a different packet that is behind the oldest packet according to the order.

6. The apparatus of claim 1, wherein the control logic circuitry is configured to:
in response to determining that the oldest packet stored in the head entry can be transferred to the first target device, transfer the oldest packet to the first target prior to transferring the other packet in the other entry to the third target device.

7. The apparatus of claim 6, wherein the control logic circuitry is configured to:
in connection with transferring the oldest packet to all target devices in the multiple target devices, update the head pointer to point at a different entry corresponding to a different packet that is behind the oldest packet according to the order.

8. The apparatus of claim 7, wherein the control logic circuitry is configured to, as part of updating the head pointer:
determine a next entry, according to the order, that includes a packet that still needs to be transferred to at least one target device; and update the head pointer to point at the determined next entry.

9. The apparatus of claim 8, wherein the control logic circuitry is configured to, as part of determining the next entry, according to the order, that includes the packet that still needs to be transferred to at least one target device:
skip over one or more entries, according to the order, that include packets that do not need to be transferred to any target devices.

10. The apparatus of claim 1, further comprising:
a crossbar communicatively coupled to the queue;
wherein the control circuitry is configured to:
provide the other packet to the crossbar, and
provide destination information to crossbar, the destination information controlling the crossbar to transfer the other packet to the second target device.

11. A method for transferring packets to a plurality of target devices, the method comprising:
receiving a plurality of packets;
storing the plurality of packets in respective entries of a queue in an order in which the plurality of packets were received, wherein a head entry of the queue corresponds to an oldest packet in the order;
receiving flow control information corresponding to the plurality of target devices, the flow control information indicating whether one or more target devices, among the plurality of target devices, are available to receive packets, the plurality of target devices including a first target device, a second target device, and a third target device;
determining that the oldest packet is intended for multiple target devices among the plurality of target devices, the multiple target device including the first target device and the second target device
determining, using the flow control information, whether any target devices among the multiple target devices is available to receive the oldest packet; and
in response to determining that i) the first target device is available to receive the oldest packet and ii) the second target device is not available to receive the oldest packet, transferring the oldest packet to the first target device and maintaining the oldest packet as the head entry;
in response to determining that no target devices in the multiple target devices are available to receive the oldest packet,
selecting an other entry, behind the head entry according to the order, that stores an other packet intended for at least the third target device that is available to receive the other packet, and
transferring the other packet in the other entry, behind the head entry according to the order, to at least the third target device prior to transferring the oldest packet in the head entry to any target device among the multiple target devices.

12. The method of claim 11, wherein transferring the other packet in the other entry, behind the head entry in the order, comprises:
transferring the other packet in the other entry while keeping a head pointer of the queue pointed at the head entry.

13. The method of claim 11, wherein:
transferring the oldest packet to the first target device and maintaining the oldest packet as the head entry comprises transferring the oldest packet to the first target device prior to transferring the other packet in the other entry to a target device for which the other packet is intended.

14. The method of claim 13, further comprising:
in connection with transferring the oldest packet to the first target device, determining whether the oldest packet is still to be transmitted to one or more additional target devices;
in response to determining that the oldest packet is still to be transmitted to one or more additional target devices, keeping a head pointer pointing at the head entry corresponding to the oldest packet; and
in response to determining that the oldest packet does not need to be transmitted to any additional target devices, updating the head pointer to point at a different entry corresponding to a different packet that is behind the oldest packet according to the order.

15. The method of claim 14, wherein updating the head pointer comprises:
determine a next entry, according to the order, that includes a packet that still needs to be transferred to at least one target device; and
update the head pointer to point at the determined next entry.

16. The method of claim 15, wherein updating the head pointer comprises:
skipping over one or more entries, according to the order, that include packets that do not need to be transferred to any target devices.

17. The method of claim 11, wherein:
receiving flow control information corresponding to the plurality of target devices comprises receiving flow control credit update information corresponding to the plurality of target devices;
the method further comprises maintaining flow control credits for the plurality of target devices; and
determining whether any target devices among the multiple target devices is available to receive the oldest packet comprises:
for each target device in the multiple target devices, determining whether there is a non-zero amount of credits for the target device, and
determining that no target devices among the multiple target devices are available to receive the oldest packet in response to determining that all of the target devices in the multiple target devices have zero credits.

18. The method of claim 11, further comprising:
generating control information that indicates one or more target devices that are both i) intended to receive the other packet, and ii) available to receive the other packet;
wherein transferring the other packet comprises using the control information to transfer the other packet to the one or more target devices that are both i) intended to receive the other packet, and ii) available to receive the other packet.

19. The method of claim 18, wherein transferring the other packet comprises:
providing the other packet to a crossbar that is coupled to the plurality of target devices; and
providing the control information to the crossbar to control the crossbar to transfer the other packet to the one or more target devices that are both i) intended to receive the other packet, and ii) available to receive the other packet.

20. The apparatus of claim 1, wherein the control logic is configured to:
maintain respective target vectors for respective packets in the queue, each target vector indicating one or more intended target devices for the packet;
determine that the oldest packet is intended for the multiple target devices using a target vector corresponding to the oldest packet; and
in connection with transferring the oldest packet to the first target device, modify the target vector corresponding to the oldest packet to indicate that the oldest packet is no longer intended for the first target device.

21. The method of claim 11, further comprising:
maintaining respective target vectors for respective packets in the queue, each target vector indicating one or more intended target devices for the packet;
wherein determining that the oldest packet is intended for the multiple target devices comprises using a target vector corresponding to the oldest packet; and
wherein the method further comprises: in connection with transferring the oldest packet to the first target device, modifying the target vector corresponding to the oldest packet to indicate that the oldest packet is no longer intended for the first target device.

* * * * *